(12) United States Patent
Shirakawa et al.

(10) Patent No.: US 7,555,895 B2
(45) Date of Patent: Jul. 7, 2009

(54) EXHAUST GAS PURIFYING APPARATUS AND METHOD FOR INTERNAL COMBUSTION ENGINE

(75) Inventors: Takashi Shirakawa, Yokohama (JP); Yasuhisa Kitahara, Yokohama (JP); Hitoshi Onodera, Kanagawa (JP); Manabu Miura, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 305 days.

(21) Appl. No.: 10/780,774

(22) Filed: Feb. 19, 2004

(65) Prior Publication Data

US 2004/0163381 A1   Aug. 26, 2004

(30) Foreign Application Priority Data

Feb. 26, 2003   (JP)   ............................. 2003-049569

(51) Int. Cl.
*F01N 3/00* (2006.01)
(52) U.S. Cl. .............................. 60/277; 60/274; 60/276; 60/285; 701/103; 701/109
(58) Field of Classification Search ................... 60/274, 60/276, 277, 285, 301; 701/103, 109
See application file for complete search history.

(56) References Cited

U.S. PATENT DOCUMENTS

| | | | | |
|---|---|---|---|---|
| 5,524,433 A | * | 6/1996 | Adamczyk et al. | ............ 60/276 |
| 5,546,920 A | | 8/1996 | Johansson | |
| 5,655,363 A | * | 8/1997 | Ito et al. | ........................ 60/276 |
| 5,735,119 A | | 4/1998 | Asanuma et al. | |
| 5,743,084 A | | 4/1998 | Hepburn | |
| 6,216,449 B1 | | 4/2001 | Strehlau et al. | |
| 6,263,667 B1 | * | 7/2001 | Sawada et al. | ................ 60/277 |
| 6,341,487 B1 | | 1/2002 | Takahashi et al. | |
| 6,357,224 B1 | | 3/2002 | Kawamoto et al. | |
| 6,383,267 B1 | | 5/2002 | Takaku | |
| 6,418,711 B1 | * | 7/2002 | Surnilla et al. | ................ 60/277 |
| 6,467,256 B2 | * | 10/2002 | Hashimoto | ................... 60/277 |
| 6,470,674 B1 | * | 10/2002 | Yamaguchi et al. | ........... 60/277 |
| 6,477,832 B1 | * | 11/2002 | Surnilla et al. | ................ 60/285 |
| 6,484,493 B2 | * | 11/2002 | Takanohashi | ................. 60/277 |
| 6,497,092 B1 | * | 12/2002 | Theis | ........................... 60/274 |

(Continued)

FOREIGN PATENT DOCUMENTS

DE    197 44 738 A1    4/1998

(Continued)

*Primary Examiner*—Tu M Nguyen
(74) *Attorney, Agent, or Firm*—Foley & Lardner LLP

(57) ABSTRACT

In exhaust gas purifying apparatus and method for an internal combustion engine, an abnormality determination of an NOx (Nitrogen Oxides) removing catalyst is executed on the basis of output values of both of a first exhaust gas atmosphere detecting section and a second exhaust gas atmosphere detecting section (for example, oxygen concentration sensors interposed in an exhaust passage of the engine between inlet and outlet portions of the NOx removing catalyst) from a time at which an output value of the first exhaust gas atmosphere detecting section is varied to a first predetermined value to a time at which the output value of the second exhaust gas atmosphere detecting section is reached to a second predetermined value when an exhaust gas atmosphere varying section (control unit) increases the ratio of a reducing agent in the exhaust gas.

20 Claims, 13 Drawing Sheets

U.S. PATENT DOCUMENTS

| | | | |
|---|---|---|---|
| 6,502,388 B2 * | 1/2003 | Takaku et al. | 60/285 |
| 6,698,187 B2 * | 3/2004 | Nishioka et al. | 60/277 |
| 6,763,656 B2 * | 7/2004 | Bidner et al. | 60/285 |
| 6,834,497 B2 * | 12/2004 | Miyoshi et al. | 60/277 |
| 7,010,907 B2 | 3/2006 | Matsubayashi et al. | |
| 7,131,261 B2 * | 11/2006 | Wackerow et al. | 60/277 |
| 2004/0112043 A1 | 6/2004 | Matsubayashi et al. | |

FOREIGN PATENT DOCUMENTS

| | | |
|---|---|---|
| EP | 1 081 348 A2 | 3/2001 |
| EP | 1 384 866 A1 | 1/2004 |
| JP | 7-180536 A | 7/1995 |
| JP | 7-279728 A | 10/1995 |
| JP | 10-299460 A | 11/1998 |
| JP | 11-324654 A | 11/1999 |
| JP | 11-347369 A | 12/1999 |
| JP | 2001-73747 A | 3/2001 |
| JP | 2001-323812 A | 11/2001 |
| JP | 2002-38929 A | 2/2002 |
| JP | 2002-332889 A | 11/2002 |
| WO | WO 02/084086 A1 | 10/2002 |

* cited by examiner

ACTUAL λ (RLAMB) CALCULATION

PUMP CURRENT→λ CONVERSION TABLE

FUEL INJECTION CHARACTERISTIC MAP

VOLUMETRIC EFFICIENCY
CORRECTION TABLE

AFM VOLTAGE-FLOW QUANTITY CONVERSION TABLE

EXHAUST SYSTEM HC QUANTITY CALCULATION

EXHAUST GAS PURIFYING APPARATUS AND METHOD FOR INTERNAL COMBUSTION ENGINE

BACKGROUND OF THE INVENTION

1. Field of the Invention

The present invention relates to exhaust gas purifying apparatus and method for an internal combustion engine and particularly relates to a technique of abnormality determination of an NOx removing (or reduction) catalyst to purify (or reduce (remove)) nitrogen oxides (NOx) in an exhaust gas of the engine.

2. Description of the Related Art

In the internal combustion engine mounted in an automotive vehicle, especially in the internal combustion engine in which a fuel mixture air under an oxygen excessive state is combustible (drivable under a air-fuel ratio of a lean state), an exhausted quantity of NOx (nitrogen oxides) during a lean drive is increased. Hence, a technique of preventing NOx exhausted from the engine with an NOx reduction (removing) catalyst disposed in an exhaust passage of the engine from being released toward the air. The r NOx reduction (removing) catalyst absorbs NOx in the exhaust gas when an air-fuel ratio of the exhaust gas streaming into the NOx removing catalyst is high (namely, lean) and the absorbed NOx in the NOx reduction (removing) catalyst is released while NOx is reduced into ($N_2$, nitrogen) when the air-fuel ratio of the exhaust gas streaming into the NOx reduction catalyst is low and a reducing agent (HC (Hydro Carbon), CO (Carbon mono-oxide), and so forth) is present so that NOx can be purified (removed from the engine. An NOx adsorption capability of NOx reduction (removing) catalyst has a limitation. Hence, before an absorption of the NOx removing catalyst has reached to a saturation quantity thereof, it is necessary to release the absorbed NOx from the NOx removing catalyst and reduce it to regenerate the NOx (reduction or removing) catalyst at an appropriate timing. Therefore, a fuel is added into the exhaust gas which is a reducing agent in a short period of time at an appropriate timing in the exhaust gas and the engine is temporarily switched into a rich drive, the air-fuel ratio of the exhaust gas is temporarily switched into a rich state, while the reducing agent (CO (Carbon mono-oxide), HC(Hydro Carbon), and so forth) is supplied. This procedure is called an execution of a rich spike control. On the other hand, to assure NOx reduction processing as described above, it is important to detect the abnormality such as deterioration of NOx (removing) reduction catalyst with a high accuracy. Hence, various methods of executing the abnormality determination of the NOx removing catalyst have been proposed.

For example, in a first previously proposed NOx removing catalyst abnormality determining apparatus disclosed in a Japanese Patent Application First Publication No. 2002-38929 published on Feb. 6, 2002, the air-fuel ratio of the exhaust gas streaming into the NOx removing (reduction) catalyst is reduced as compared with a case where the absorption capability of NOx (reduction) removing catalyst is temporarily regenerated and, thereafter, a deterioration of an absorption-storage reduction type NOx catalyst is determined on the basis of a time duration for which the air-fuel ratio streaming out of the NOx catalyst indicates a rich air-fuel ratio.

In a second previously proposed NOx reduction (removing) catalyst abnormality determining apparatus disclosed in a Japanese Patent Application First Publication No. 2001-73747 published on Mar. 31, 2001, the deterioration of the NOx reduction (removing) catalyst is determined on the basis of a measurement time from a time point at which the output of an oxygen concentration sensor located at an upstream side of the exhaust passage with respect to the NOx removing (reduction) catalyst is varied to a time point at which another oxygen concentration sensor located at a downstream side of the exhaust passage with respect to the NOx removing (reduction) catalyst when the air-fuel ratio of an air mixture fuel supplied to the engine is switched from a rich state to a lean state and another measurement time from a time point at which the output of the oxygen concentration sensor located at the upstream side of NOx removing (reduction) catalyst is varied to a time point at which the output of the oxygen concentration sensor located at the downstream side of NOx removing (reduction) catalyst to a time point at which the output of the oxygen concentration sensor located at the downstream side of NOx removing (reduction) catalyst is varied when the air-fuel ratio of the air mixture fuel supplied to the engine is switched from the rich state to the lean state.

Furthermore, in a third previously proposed NOx removing (reduction) catalyst deterioration (abnormality) determining apparatus disclosed in a Japanese Patent Application First Publication No. Heisei 11-324654 published on Nov. 26, 1999 (which corresponds to a U.S. Pat. No. 6,216,449 issued on Apr. 17, 2001), a time interval from a time at which the air-fuel ratio of the exhaust gas is switched from the lean state to the rich state to a time at which this rich exhaust gas is passed through the catalyst and another time interval from a time at which the air-fuel ratio of the exhaust gas is again switched from the rich state to the lean state and the lean exhaust gas is passed through the catalyst from the timing at which the above-described switching is performed are measured. The measured respective time intervals are used to evaluate an oxygen adsorption and storage function and NOx adsorption function and NOx adsorption function are evaluated. That is to say, in any case of the above-described three previously proposed apparatuses, the determination on the deterioration of the NOx removing catalyst is carried out using a time duration for which an exhaust gas atmosphere (a ratio between the oxidizing agent and reducing agent) streaming out of the catalyst is detected during the rich spike control at which NOx absorbed in the catalyst is released and reduced and the detected exhaust gas atmosphere falls in a predetermined range.

SUMMARY OF THE INVENTION

However, in each of the above-described previously proposed NOx reduction (removing) catalyst deterioration determining apparatuses disclosed in the above-identified Japanese Patent Application First Publications, the following inconveniences occur since no consideration is paid to deviations in an air-fuel mixture control in the rich spike control. Suppose a case such that the deterioration determination is made using a time duration $t_i$ for which the air-fuel ratio located at the downstream side of exhaust passage with respect to the NOx removing catalyst during the rich spike control. In a case where a target air-fuel ratio (a target excess air ratio) in the rich spike control is set so as to be deviated toward the rich side, as compared with a time interval of $t_1$ in a case where the target air-fuel ratio (target excess air ratio) is set to a natural value (reference value), a time interval $t_2$ becomes short and, if the target air-fuel ratio is set so as to be deviated toward the lean side, a time interval of $t_3$ becomes long. That is to say, a time interval for which the target air-fuel ratio is maintained in the proximity to the stoichiometric air-fuel ratio is a time duration for which the oxygen stored in the NOx removing catalyst is a time interval during which the oxygen is reacted with the reducing agent under the reducing atmosphere. Hence, as the air-fuel ratio of the exhaust gas streaming into the NOx removing (reduction) catalyst is varied, the maintaining time interval is naturally varied. Hence, merely, when time interval ($t_r$) is measured and the measured time interval is compared with a predetermined threshold value to determine the presence of the deterioration of the NOx removing catalyst, due to a control error of the air-fuel ratio at that time (a deviation of a target lambda ($\lambda$)), even if the deterioration state at the same level occurs, there is a possibility that the deterioration is determined to occur or not to occur. An erroneous deterioration determination may occur for the catalyst of a new product.

It is naturally important that to attempt an improvement in the accuracy of the air-fuel ratio control during the rich spike control. However, there is a limitation on the improvement in the accuracy of the air-fuel ratio control in a form of a feedback control by means of a sensor detecting the exhaust gas atmosphere, during the rich spike control for at most several minutes. Hence, it is necessary to presume that an error always occurs to some degree while carrying out the abnormality determination of the catalyst during the rich spike control.

It is, therefore, an object of the present invention to provide exhaust gas purifying apparatus and method for an internal combustion engine which are capable of determining accurately a performance abnormality (a magnitude of abnormality and including a performance deterioration) even when a control deviation occurs in the air-fuel ratio control during the rich spike control.

According to one aspect of the present invention, there is provided an exhaust gas purifying apparatus for an internal combustion engine, comprising: an NOx removing catalyst that absorbs nitrogen oxides in an exhaust gas of the engine when an air-fuel ratio of the exhaust gas streaming thereinto is lean and that releases and reduces the absorbed nitrogen oxides therefrom when the air-fuel ratio of the exhaust gas streaming thereinto is rich; an exhaust gas atmosphere varying section that varies a ratio between an oxidizing agent in the exhaust gas and a reducing agent therein; a first exhaust gas atmosphere detecting section disposed in an upstream side of an exhaust passage with respect to the NOx removing catalyst to detect the ratio between the oxidizing agent in the exhaust gas and the reducing agent therein; a second exhaust gas atmosphere detecting section disposed in a downstream side of the exhaust passage with respect to the NOx removing catalyst to detect the ratio between the oxidizing agent in the exhaust gas and the reducing agent therein; an abnormality determining section that executes an abnormality determination of the NOx removing catalyst on the basis of output values of both of the first exhaust gas atmosphere detecting section and the second exhaust gas atmosphere detecting section from a time at which the output value of the first exhaust gas atmosphere detecting section is varied to a first predetermined value to a time at which the output value of the second exhaust gas atmosphere detecting section is reached to a second predetermined value when the exhaust gas atmosphere varying section increases the ratio of the reducing agent in the exhaust gas.

According to another aspect of the present invention, there is provided an exhaust gas purifying method for an internal combustion engine, the internal combustion engine comprising an NOx removing catalyst that absorbs nitrogen oxides in an exhaust gas of the engine when an air-fuel ratio of the exhaust gas streaming thereinto is lean and that releases and reduces the absorbed nitrogen oxides therefrom when the air-fuel ratio of the exhaust gas streaming thereinto is rich; providing an exhaust gas atmosphere varying section that varies a ratio between an oxidizing agent in the exhaust gas and a reducing agent therein; providing a first exhaust gas atmosphere detecting section disposed in an upstream side of an exhaust passage with respect to the NOx removing catalyst to detect the ratio between the oxidizing agent in the exhaust gas and the reducing agent therein; providing a second exhaust gas atmosphere detecting section disposed in a downstream side of the exhaust passage with respect to the NOx removing catalyst to detect the ratio between the oxidizing agent in the exhaust gas and the reducing agent therein; and executing an abnormality determination of the NOx removing catalyst on the basis of output values of both of the first exhaust gas atmosphere detecting section and the second exhaust gas atmosphere detecting section from a time at which the output value of the first exhaust gas atmosphere detecting section is varied to a first predetermined value to a time at which the output value of the second exhaust gas atmosphere detecting section is reached to a second predetermined value when the exhaust gas atmosphere varying section increases the ratio of the reducing agent in the exhaust gas.

This summary of the invention does not necessarily describe all necessary features so that the invention may also be a sub-combination of these described features.

DETAILED DESCRIPTION OF THE PREFERRED EMBODIMENTS

Reference will hereinafter be made to the drawings in order to facilitate a better understanding of the present invention.

First Embodiment

Figure 1:
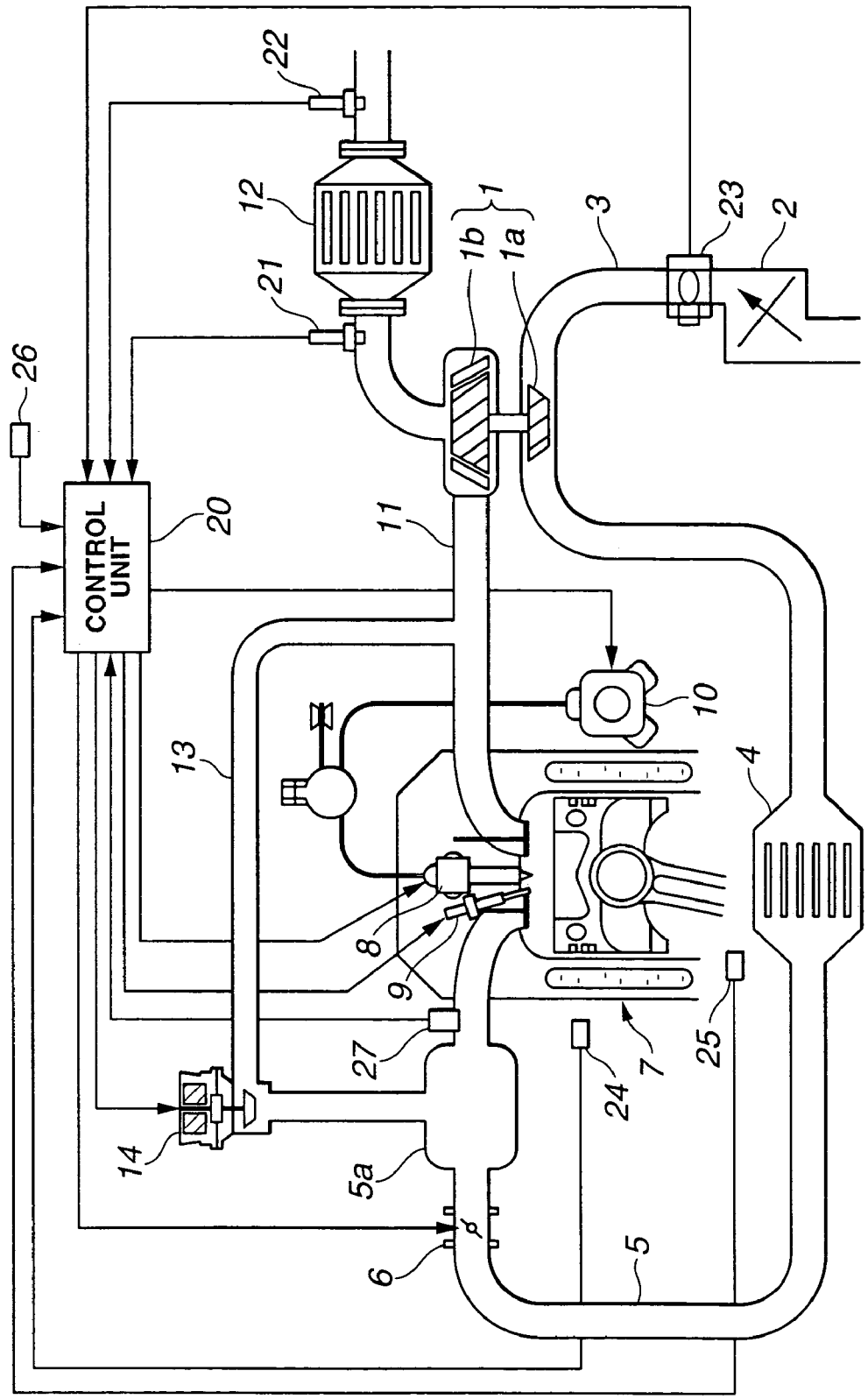
FIG. 1 is a rough system configuration view of an exhaust gas purifying apparatus for an internal combustion engine in a first preferred embodiment according to the present invention.

FIG. 1 shows an example of a whole system configuration of an exhaust gas purifying apparatus for an internal combustion engine in a first preferred embodiment according to the present invention. The system configuration shown in FIG. 1 can be applied equally well to second and third preferred embodiments which will be described later. In FIG. 1, a turbo charger 1 is disposed to compress an air sucked into an intake air passage 3 through its compressor 1a with a dust and dirt in the air eliminated by means of an air cleaner 2. The compressed air is cooled by means of an inter-cooler 4 and supplied to an intake manifold 5. An intake air quantity is adjusted by means of an electronically controlled throttle valve 6. It is noted that turbo charger 1 is of a, so-called, a variable nozzle type and a turbo charged pressure can variably be adjusted. In each cylinder of engine 7, a fuel injector (or a fuel injection valve) and a spark plug are installed. Fuel injector 8 serves to directly inject a fuel pressurized and supplied to a supply pump 10 under a predetermined pressure within a combustion chamber. The injected fuel is ignited and burned. The combusted exhaust gas is exhausted through an exhaust manifold 11 to drivingly revolve a turbine 1b of turbo charger 1. Thereafter, NOx (nitrogen oxides) in the exhaust gas is removed by means of an NOx removing (reduction) catalyst 12. NOx removing (reduction) catalyst 12 is formed with a coating layer carrying a noble metal such as a Platinum (Pt) and NOx absorbing agent held by a honeycomb shaped carrier. In addition, as an NOx absorbing agent, at least one of an alkali metal, for example, a Cesium (Cs), an alkali earth series such as a Balium (Ba), and a rear earth series such as a Lanthanum (La) is selected.

In NOx removing (reduction) catalyst 12, an oxygen in the exhaust gas is adhered onto the Platinum (Pt) during an exhaust gas lean state at which an oxygen concentration in the exhaust gas streaming into NOx removing catalyst 12 is high and NO (nitrogen oxide) in the exhaust gas is oxidization reacted on the Platinum (Pt) to provide $NO_2$ ($2NO+O_2 \rightarrow 2NO_2$). Then, $NO_2$ is reacted as NOx absorbent and absorbed as a nitric acid ion ($NO_3^-$).

On the other hand, during the exhaust gas rich state in which the oxygen concentration in the streaming exhaust gas into NOx removing catalyst 12 is low, HC and CO in the exhaust gas is oxidization reacted (oxidized) with the Platinum (Pt) so that $H_2O$ and $CO_2$ ($HC+CO+O_2 \rightarrow H_2O+CO_2$) are given. At this time, NOx ($NO_2$ or NO) is discharged from NOx absorbent. HC and CO included in the exhaust gas is extremely strong in a bonding force with the oxygen. If extra HC and CO are present in the exhaust gas, the released NOx is reacted with HC and CO so as to be reduced to a harmless $N_2$. In this way, NOx removing (reduction) catalyst 12 absorbs NOx in the exhaust gas when the exhaust system streaming exhaust gas air-fuel ratio is lean and the absorbed NOx is released and reduced to remove the NOx in the exhaust gas when the exhaust gas air-fuel ratio streaming into NOx removing catalyst 12 is rich to purify NOx in the exhaust gas.

Sensors 21 and 22 (first and second exhaust gas atmosphere detecting sections (means)) are disposed on both of upstream and downstream sides of exhaust passage (exhaust manifold 11 or exhaust system) with respect to NOx removing (reduction) catalyst 12 to detect ratios between an oxidizing agent (mainly, oxygen) and a reducing agent (mainly, HC(Hydrocarbon) in the exhaust gas, respectively. As these sensors, in addition to sensors 21, 22 which directly detect the ratio between the oxidizing agent and the reducing agent in the exhaust gas, other sensors which indirectly detect the ratios respectively may be interposed between the upstream and downstream sides with respect to NOx removing catalyst 22. For example, each of the above-described other sensors includes the oxygen concentration sensor to detect the oxygen concentration in the exhaust gas, a wide area air-fuel ratio meter (so-called, λ (lambda) sensor), or NOx sensor to detect the NOx (nitrogen oxides) concentration in the exhaust gas. The lambda (λ) sensor is exemplified by a U.S. Pat. No. 5,546,920 issued on Aug. 20, 1996.

Furthermore, an EGR (Exhaust-Gas Recirculation) passage 13 which connects a collector portion 5a of an intake manifold 5 and an exhaust manifold 11 and an EGR valve 14 which opens or closes EGR passage 13 are disposed so that an exhaust gas recirculation quantity can be adjusted in accordance with the driving condition.

A control unit (C/U or controller) 20 receives detection signals from various sensors such as sensors 21 and 22 to detect the ratio between the oxidizing agent and the reducing agent in the exhaust gas, an airflow meter (AFM) 23 to detect an intake air quantity of engine 7, a coolant temperature of engine 7, a crank angle sensor 25 to detect an engine speed (Ne), an accelerator opening angle sensor 26 to detect an accelerator opening angle APO, an intake air pressure sensor 27, and so forth. Then, control unit 20 executes controls over engine 7 such as a fuel injection (quantity and timing) control and an ignition timing control on the basis of the detection signals from the inputted various sensors.

In addition, as will be described later, control unit 20 executes a rich spike control in which a reducing agent rate in the exhaust gas is increased and to richen the exhaust gas air-fuel ratio so that the adsorbed NOx in NOx removing (reduction) agent 12 is released and reduced and executes a determination of the abnormality in a performance such as a deterioration of NOx removing (reduction) catalyst 12. Hence, control unit 20 corresponds to exhaust gas atmosphere varying means (section) and abnormality determining means (section) according to the present invention. It is noted that the rich spike control is well known art and the detailed explanation of the rich spike control will herein be omitted.

For example, as disclosed in a Japanese Patent Application First Publication No. Heisei 7-279728 published on Oct. 27, 1995, EGR valve 14 is opened or an electronically controlled throttle valve 6 is closed to decrease the intake air quantity and to increase the fuel injection quantity not for engine output torque to be varied. As disclosed in a Japanese Patent Application First Publication No. 2002-332889 published on Nov. 22, 2002, the fuel is supplied (as a main injection) during a suction or compression stroke and the fuel supply is subsidiary added (as a subsidiary injection) during the explosion or exhaust stroke or the reducing agent additive means (section) causes the addition of the reducing agent (fuel) in the exhaust gas directly in the exhaust gas by means of the reducing agent additive means (section).

In this way, the rich spike control is carried out. The rich spike control is also exemplified by a U.S. Pat. No. 6,341,487 issued on Jan. 29, 2002 (the disclosure of which is herein incorporated by reference).

The abnormality determination is based on, during the execution of the rich spike control, output values of the upstream side sensor 21 with respect to NOx removing agent 12 and of the downstream side sensor 22 with respect to NOx removing catalyst 12 for an interval of time during which the output value of the downstream side sensor 22 is maintained within a predetermined range in a proximity to a stoichiometric air-fuel ratio.

It is noted that a rich spike control execution flag (hereinafter, referred simply as flag Frich) is assumed to be set. Herein, as a sensor for detecting the ratio between the oxidizing agent and reducing agent in the exhaust gas, the oxygen concentration sensors (hereinafter also called, an upstream side $O_2$ sensor and a downstream side $O_2$ sensor) in which the output voltages are abruptly varied in the vicinity to the stoichiometric air-fuel ratio are used and determines an integration value with respect to time of an output difference between the upstream $O_2$ sensor and the downstream $O_2$ sensor to carry out the abnormality determination.

FIGS. 2, 3A through 3C show an operational flowchart of the abnormality determination carried out in the first embodiment and its calculation contents.

Figure 2:
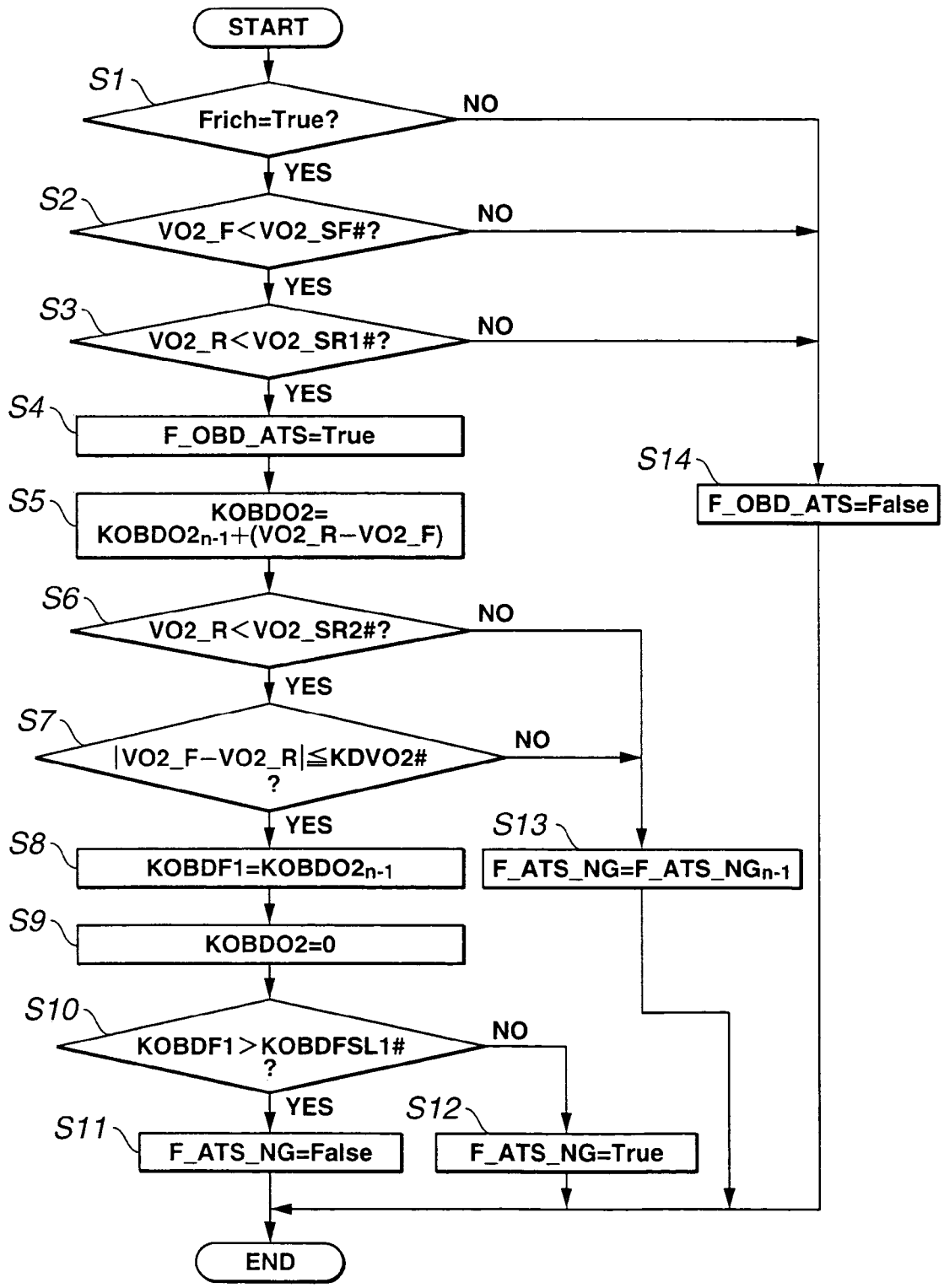
FIG. 2 is an operational flowchart of an abnormality determination executed by a control unit shown in FIG. 1.
Figure 3A:
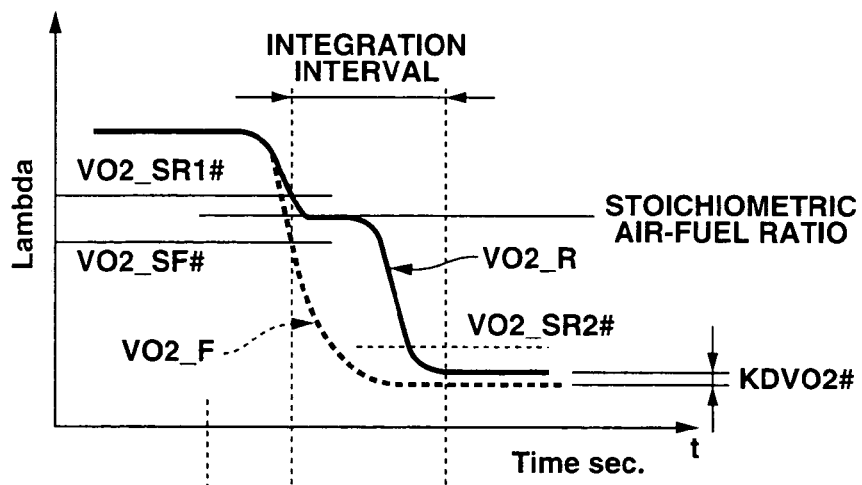
FIGS. 3A, 3B, and 3C are explanatory characteristic graphs for explaining the contents of calculation executed in FIG. 2.
Figure 3B:
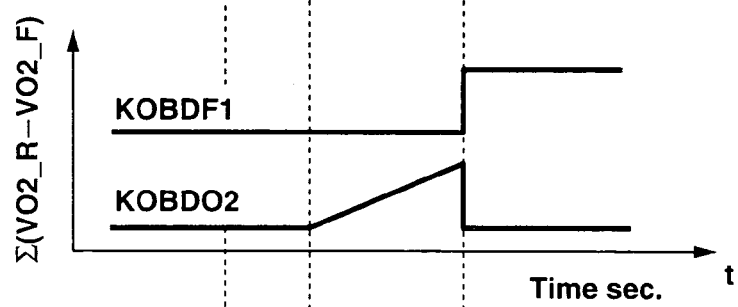
Figure 3C:
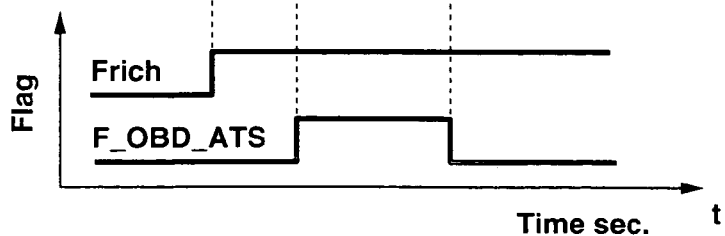

At a step S1, control unit 20 determines whether flag Frich is set (true) or not. If Frich is set (Frich=true) (Yes) at step S1, the routine goes to a step S2. At step S2, control unit 20 determines whether an output voltage VO2_F of upstream side $O_2$ sensor is smaller than a predetermined value VO2_SF# (first predetermined value<stoichiometric air-fuel ratio corresponding value). If voltage VO2_F is smaller than first predetermined value VO2_SF#, the routine goes to a step S3. At step S3, control unit 20 determines whether a voltage VO2_R of the downstream side $O_2$ sensor is smaller than predetermined value VO2_SR1# (>stoichiometric air-fuel ratio corresponding value). If voltage VOL_F is smaller than predetermined value VO2_SR1# (>stoichiometric air-fuel ratio) (Yes), the routine goes to a step S4. According to the results of steps S1 through S3, control unit 20 determines that the rich spike control is being executed. The actual exhaust gas air-fuel ratio is changed from lean state to rich state (a release of NOx and the reduction reaction is started). If these conditions are established, the routine goes to a step S4 at which control unit 20 sets an abnormality determination execution flag (hereinafter, referred to as a flag F_OBD_ATS) (F_OBD_ATS=True). Then, the routine goes to a step S5. On the other hand, in a case where any one or more of the conditions described at steps S1 through S3 are not established, the routine goes to a step S14 at which a flag F_OB-D_ATS is released and the processing routine of FIG. 2 is ended with (F_OBD_ATS=False).

At a step S5, control unit 20 calculates an integration quantity (integration value) KOBDO2 with respect to time of the difference of the output voltages between downstream side $O_2$ sensor voltage VO2_R and upstream side $O_2$ sensor voltage VO2_F using the following equation.

$$KOBDO2=KOBDO2_{n-1}+(VOL\_R-VO2\_F).$$

At a step S6, control unit 20 determines whether voltage VO2_R is lower (smaller) than a predetermined value of VO2_SR2# (second predetermined value<stoichiometric air-fuel ratio corresponding value). If VO2_R<VO2_SR2# (Yes) at step S6, the routine goes to a step S7. Thus, control unit 20 determines whether a time duration for which a downstream side exhaust gas air-fuel ratio with respect to NOx removing (reduction) catalyst 12 is held in the vicinity to the stoichiometric air-fuel ratio (hereinafter, referred to as a stoichiometric air-fuel ratio hold time interval), namely, determines whether the release of NOx absorbed in NOx removing catalyst 12 is finished. On the other hand, if voltage VO2_R is equal to or higher than a predetermined value of VO2_SR2#, the routine goes to a step S13 at which the present determination is the same as the result of the previous determination and the routine of FIG. 2 is ended.

At step S7, control unit 20 determines whether an absolute value of the difference between the voltages of the upstream $O_2$ sensor and the downstream $O_2$ sensor is equal to or lower than KDVO2# (a third predetermined value) falls within a predetermined value KDVO2#. If the absolute value of the difference is within the third predetermined value (KDVO2#), the routine goes to a step S8. If |VO2_F−VO2_R|>KDVO2# (No) at step S7, it can be thought that the abnormality determination is not carried out under a normal state due to such a fact that either or two of $O_2$ sensors have the abnormalities, then, the routine goes to step S13 at which the processing is ended since the present result is the same result of the previous determination. Thus, the present routine of FIG. 2 is ended. It is noted that, in a case where this step S13 is repeated, the sensor abnormality may be detected with a high possibility. At the next step S8, control unit 20 decides that the calculated integration value of KOBDO2 is a voltage value of a final $O_2$ sensor voltage value KOBDF1 used for the abnormality determination. At the next step S9, control unit 20 clears the integration quantity KOBODO2. At a step S10, control unit 20 determines whether final $O_2$ sensor voltage value KOBDF1 is larger than a predetermined catalyst abnormality determination threshold value KOBBDFSL1#. Then, in a case where final $O_2$ sensor voltage value KOBDF1 is larger than the predetermined catalyst abnormality determination threshold value KOBDFSL#, the routine goes to a step S11. Then, at step S11, control unit 20 determines that the catalyst is normal and sets flag F_ATS_NG=true. Then, the routine is ended. On the other hand, if KOBDF1≦KOBDFSL1# (No) at step S10, control unit 20 determines that the catalyst is abnormal (deteriorated) and flag F_ATS_NG=False. Then, the present routine is ended.

The above-described stoichiometric air-fuel ratio hold time interval is a time duration for which the oxygen stored in NOx removing (reduction) catalyst 12 (storage $O_2$, an oxide component of the desorbed NOx) is reacted with the reducing agent (HC, CO) under reducing agent atmosphere. Hence, if the state of the NOx removing (reduction) catalyst 12 is the same, a control error of the air-fuel ratio (excess air ratio) at the rich spike control, namely, the control error is increased or decreased due to the variation of the exhaust gas air-fuel ratio streaming into NOx removing catalyst 12 even if the state of NOx removing (reducing) catalyst 12 is the same.

On the other hand, due to the difference of the voltages VO2_R and VO2_F between the downstream side $O_2$ sensor 22 and upstream side $O_2$ sensor 21, control unit 20 can estimate a quantity by which the oxygen component stored in NOx removing (reduction) catalyst 12 is reacted with the reducing agent under the reducing atmosphere. Hence, the integration value during the stoichiometric air-fuel ratio hold interval of time due to this difference (namely, final oxygen voltage value KOBDF1) corresponds to a gross oxygen quantity reacted with the reducing agent during the completion of release of the absorbed NOx and should become approximately constant if the state of NOx removing (reduction) catalyst 12 is the same.

In this embodiment, the oxygen concentration sensor ($O_2$ sensor) is used as means for detecting the ratio between the oxidizing agent and reducing agent in the exhaust gas. The integration value (quantity) (final oxygen sensor voltage value KOBDF1) of the difference between voltage value VO2_R and voltage value VO2_F of downstream side $O_2$ sensor 22 and upstream side $O_2$ sensor 21 is calculated. Then, this final oxygen concentration sensor voltage value KOBDF1 is compared with catalyst abnormality determination threshold value KOBDFSL1# to determine whether the abnormality of the NOx removing catalyst is present or absent. Hence, the influence caused by the control error and the control deviation of the air-fuel ratio (excess air ratio) in the rich spike control is eliminated and a stable abnormality determination with a high accuracy can be achieved.

In addition, in this embodiment, if the difference of the voltage values of VO2_F and VO2_R of upstream $O_2$ sensor 21 and downstream $O_2$ sensor 22 falls within a predetermined value of KDVO2# even if voltage value VO2_R of downstream side $O_2$ sensor 22 is lower (smaller) than predetermined value VO2_SR2#, the abnormality determination is suspended so that the previous determination result is used. Hence, the abnormality determination under the normal state is secured and an erroneous determination can be prevented from occurring.

Second Embodiment

Next, the abnormality determination of NOx removing (reduction) catalyst 12 in the second preferred embodiment of the exhaust gas purifying apparatus according to the present invention will be explained.

In this embodiment, as the sensors to detect the ratio between the oxidizing agent and the reducing agent, the wide area air-fuel ratio meters (hereinafter, called an upstream side λ sensor and a downstream side λ (lambda) sensor) are used and the abnormality determination is carried out by determining the integration quantity (value) with respect to time of the difference as will be described below.

Figure 4:
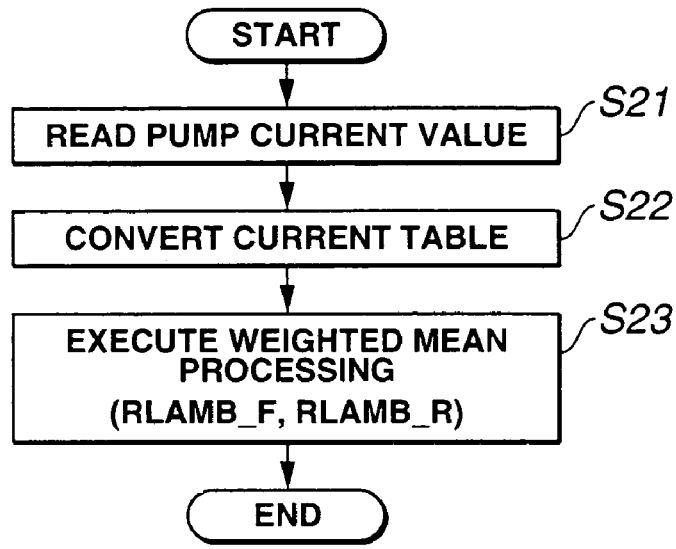
FIG. 4 is an operational flowchart representing actual excess air ratio.

FIG. 4 shows an operational flowchart calculating excess air ratio RLAMB executed in the second embodiment. It is noted that the calculation methods of the upstream side λ sensor and the downstream side λ sensor are mutually the same. In FIG. 4, control unit 20 reads a pump current value of each λ sensor at a step S21.

Figure 5:
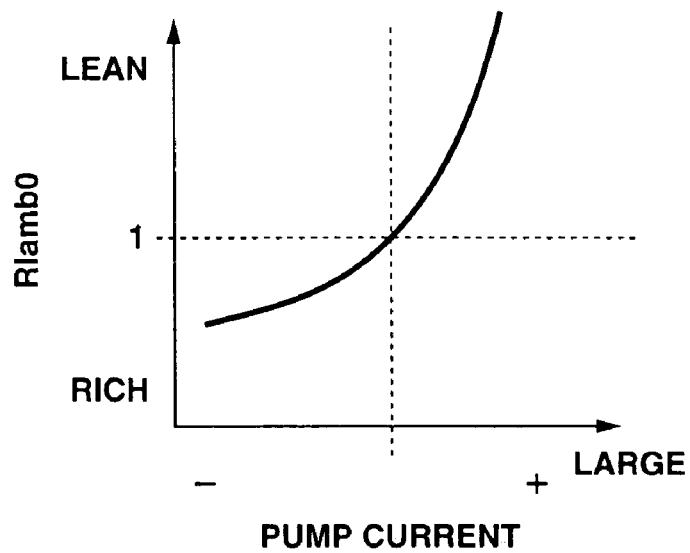
FIG. 5 is a conversion table representing a conversion of a pump current of each $\lambda$ sensor to actual excess air ratio in a case of the exhaust gas purifying apparatus in a second preferred embodiment according to the present invention.

At a step S22, control unit S21 searches for a table shown in FIG. 5 to calculate an actual excess air ratio R1amb0. Then, at a step S23, control unit 20 carries out a weighted mean processing to set the upstream side exhaust gas excess air ratio (hereinafter, an upstream side excess air ratio) at the upstream side of NOx removing (reduction) catalyst 12 to RLAMB_F and the downstream side exhaust gas excess air ratio (hereinafter, a downstream side excess air ratio) to PLAMB_R. Then, the routine of FIG. 4 is ended.

Figure 6:
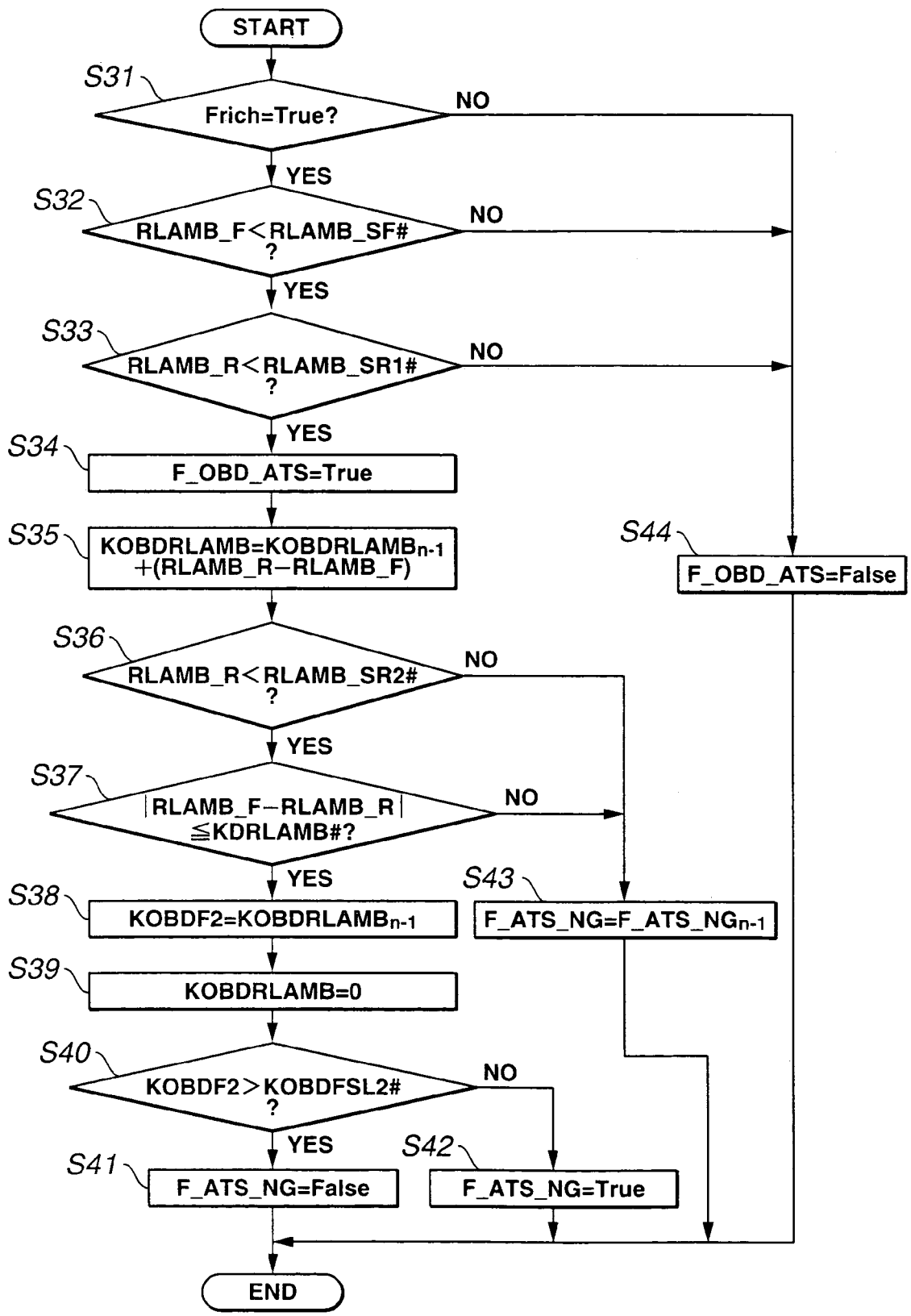
FIG. 6 is an operational flowchart of an abnormality determination executed by the control unit in the case of the second embodiment shown in FIG. 5.

FIG. 6 shows an operational flowchart on the abnormality determination of NOx removing (reduction) catalyst 12 in the second embodiment. In place of the $O_2$ sensor voltage VO2 described in the first embodiment, excess air ratio RLMB is used. Other than these elements, the abnormality determination in the second embodiment (refer to FIG. 2) is basically the same as described in the first embodiment.

At a step S31 in FIG. 6, control unit determines whether flag Frich is set or not. If set (true) (Yes) at step S31, the routine goes to a step S32. At a step S32, control unit 20 determines whether upstream side excess air ratio RLAMB_F is smaller than a predetermined value FLAMB_SF# (<1.0). If R+LAMB_R<RLAMB_SF# (Yes) at step S33, the routine goes to a step S34. If none of the conditions at steps S31 through S33 (No), the routine goes to a step S44 at which flag F_OBD_ATS=False and the present routine of FIG. 6 is ended. At step S34, control unit 20 sets flag as follows: F_OBD_ATS=True. At a step S35, control unit 20 calculates the integration quantity KOBDRLAMB of the difference between upstream side excess air ratio PLAMB_R and downstream side excess air ratio RLAMB_F using the following equation:

$$KOBDRLAMB = KOBDRLAMB_{n-1} + (RLAMB\_R - RLAMB\_F),$$

wherein n denotes an arbitrary integer and $KOBDRLAMB_{n-1}$ denotes a previous value of KOBDRLAMB. At steps of S36 and S37, control unit 20 determines whether downstream side excess air ratio RLAMB_R is smaller than a predetermined value PLAMB_SR2# (<RLAMB_SF1#), namely, determines whether the time interval during which the air-fuel ratio is maintained in the proximity to the stoichiometric air-fuel ratio is ended. If ended, control unit 20 determines whether the difference between upstream side excess air ratio RLAMB_F and downstream side excess air ratio RLAMB_R is within predetermined value KDRLAMB#. On the other hand, if downstream side excess air ratio RLAMB_R is equal to or larger than a predetermined value RLAMB_SR2#, and if the difference between the excess air ratio at the downstream side and the upstream side is larger than a predetermined value KDRLAMB#, the routine goes to a step S43. In the same way as the first embodiment (step S13), the present result of determination is the same as the previous result of determination at step S43. Then, the routine is ended. At step S38, the calculated integration value KOBDRLAMB is defined as final excess air ratio integration value KOBDF2 used for the abnormality determination. At a step S39, control unit 20 clears the integration value of KOBDRLAMB.

At a step 40, control unit 20 determines whether an integration value of the final excess air ratio KOBDF2 is larger than a predetermined catalyst abnormality determination threshold value KOBDFSL2#. If KOBDFSL2#>KOBDFSL2# (Yes) at step S40, the routine goes to a step S41. At step S41, control unit 20 determines that the catalyst is normal and flag F_ATS_NG=False. Then, the routine in FIG. 6 is ended. On the other hand, in a case where KOBDFSL2# is equal to or lower than catalyst abnormality determination threshold value KOBDFS2#, the routine goes to a step S42. At step S42, control unit 20 determines that the catalyst is abnormal (deteriorated) and the processing is ended as flag F_ATS_NG=True.

Control unit 20 can estimate an extra reducing agent (HC) under a state where the oxygen (component) stored in NOx removing (reduction) catalyst 12 is reacted with the reducing agent under the reducing agent atmosphere according to a difference between downstream side excess air ratio RLAMB_R and upstream side excess air ratio RLAMB_F. Hence, the integration quantity during the stoichiometric air-fuel ratio holding interval on the difference (namely, final excess air ratio integration value KOBBDF2) is reacted with the oxygen until the release of the absorbed NOx is completed corresponds to a gross reducing agent quantity (HC quantity). In the same way as the gross oxygen quantity in the first embodiment, if the state of NOx removing (reduction) catalyst 12 is the same, the integration quantity KOBBDF2 is approximately the same as the gross reducing agent quantity.

Figure 7A:
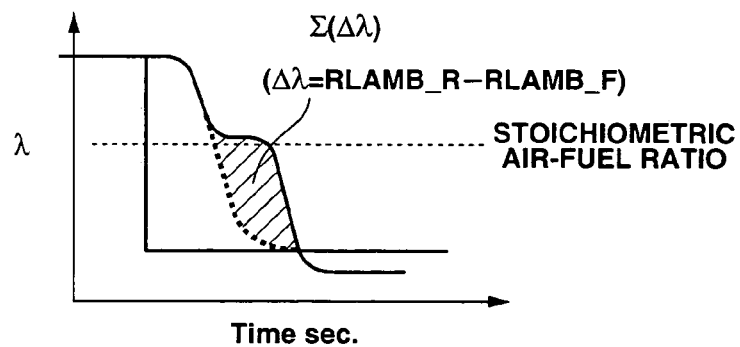
FIGS. 7A, 7B, and 7C show explanatory views of the abnormality determination in the case of the second preferred embodiment according to the present invention shown in FIGS. 5 and 6.
Figure 7B:
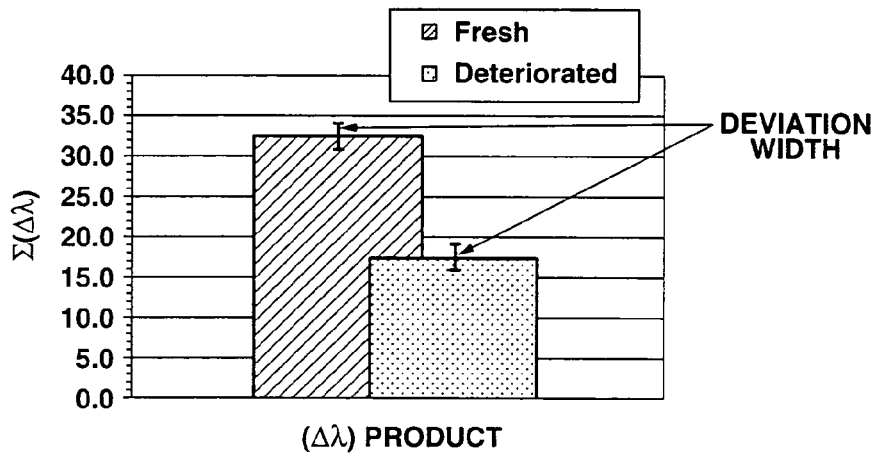
Figure 7C:
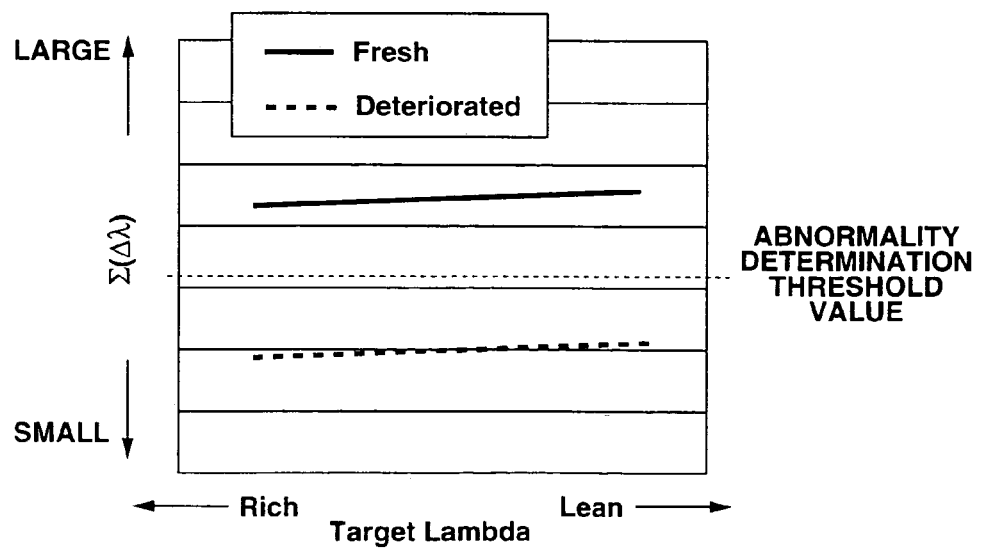

In this embodiment, the wide area air-fuel ratio meter ($\lambda$ sensor) is used as means for detecting the ratio between the oxidizing agent and reducing agent in the exhaust gas, the integration quantity (final excess air ratio integration value KOBDF2) during the stoichiometric air-fuel ratio holding interval on the difference between the upstream side excess air ratio and downstream side excess air ratio detected by each $\lambda$ sensor is calculated (as denoted by an oblique lined portion in FIG. 7A), the deterioration of the catalyst is determined as being present by comparing final excess air ratio integration value KOBDF2 with catalyst abnormality determination threshold value KOBDFSL2# previously determined by experiments. Hence, as shown in FIGS. 7B and 7C, influence of the control error and the control deviation the air-fuel ratio (excess air ratio) in the rich spike control is eliminated. Thus, a stable abnormality determination with a high accuracy can be achieved.

Third Embodiment

Next, the abnormality determination of NOx removing (reduction) catalyst 12 in the case of the third preferred embodiment of the exhaust gas purifying apparatus will be described below. In this embodiment, the wide area air-fuel ratio meter (so called, $\lambda$ (lambda) sensor) as the sensors to detect the ratio between the oxidizing agent and the reducing agent in the same way as the second embodiment is used and the abnormality determination is carried out by deriving an extra reducing quantity (HC quantity) from excess air ratio RLAMB and an intake fresh air quantity Qac.

Figure 8:
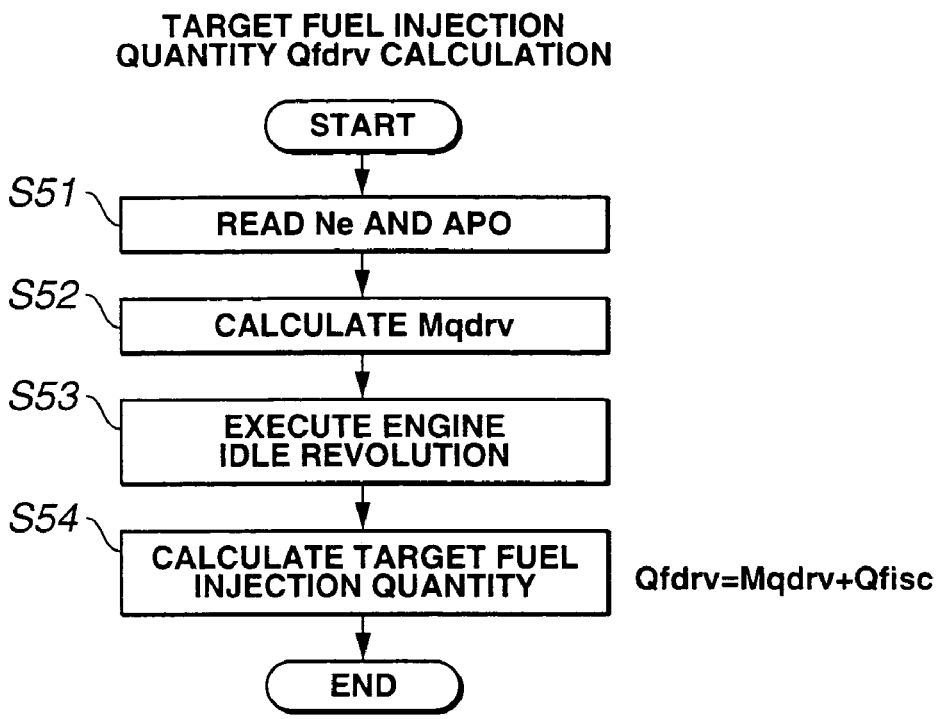
FIG. 8 is an operational flowchart representing a calculation of a target fuel injection quantity.
Figure 9:
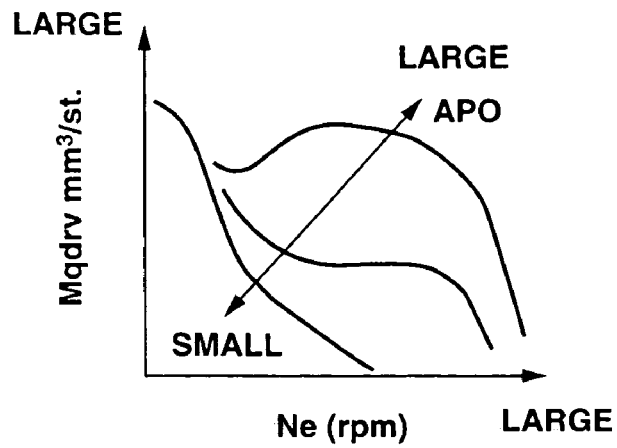
FIG. 9 is an example of a basic fuel injection quantity map representing a basic fuel injection quantity.

FIG. 8 shows an operational flowchart calculating a target fuel injection quantity Qfdrv in accordance with an accelerator demand (depression of an accelerator pedal). In FIG. 8, at a step S51, control unit 20 reads engine speed Ne and accelerator opening angle APO. At a step S52, control unit 20 determines a basic fuel injection quantity Mqdrv by referring to a map as shown in FIG. 9 from accelerator opening angle APO.

Figure 10:
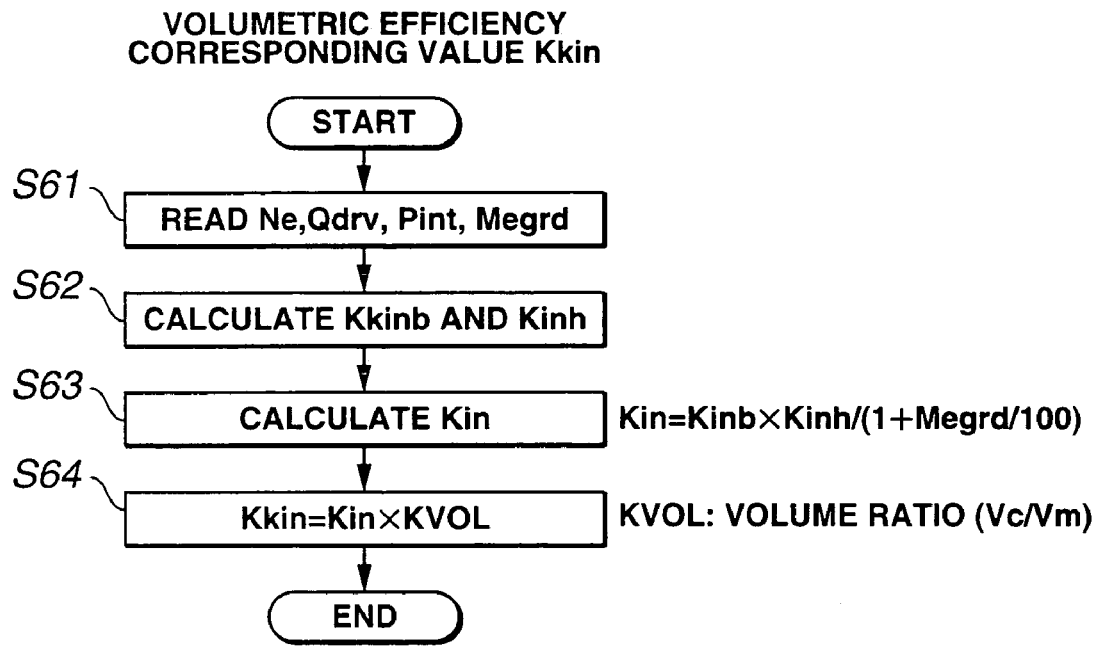
FIG. 10 is an operational flowchart representing a calculation of a volumetric efficiency corresponding value Kkin.

At a step S53, control unit 20 determines an idling revolution correction quantity Qfisc. At a step S54, control unit 20 calculates a target fuel injection quantity Qfdrv (=Mqdrv+Qfisc). Then, the routine is ended. FIG. 10 shows an operational flowchart to calculate a volumetric efficiency corresponding value Kin. Volumetric efficiency corresponding value Kin is used to calculate a response time constant corresponding value Kkin in the intake air system.

Figure 11:
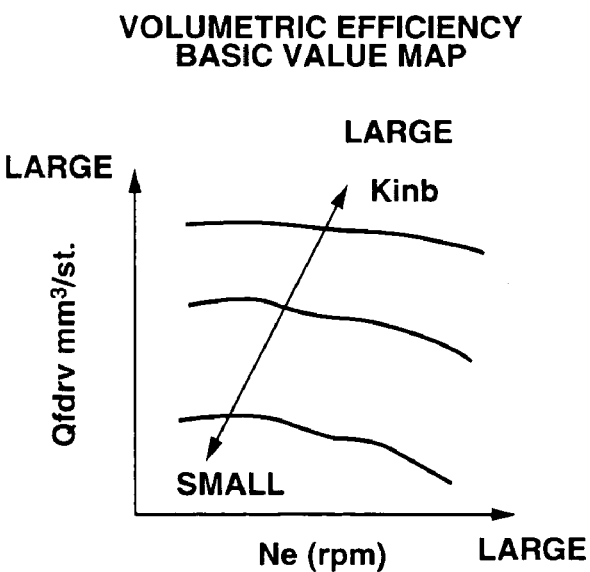
FIG. 11 is an example of a map representing a table to calculate an intake air pressure correction value.
Figure 12:
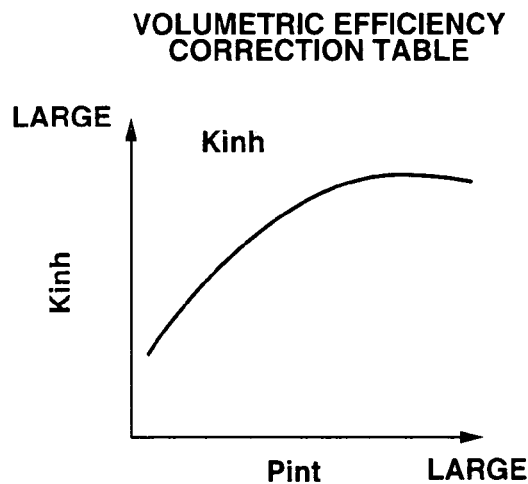
FIG. 12 is an example of a map representing a volumetric efficiency correction value.

In FIG. 10, at a step 61, control unit 20 reads engine revolution speed Ne, target fuel injection quantity Qfdrv, an intake air pressure Pint, and a target EGR rate Megrd. It is noted that, in the third embodiment, an intake air pressure Pint is detected by means of an intake air pressure sensor 27. However, the intake air pressure may be estimated by, for example, the turbo charged pressure. At a step S62, control unit 20 calculates volumetric efficiency corresponding basic value Kinb, and intake air pressure correction value Kinh. Specifically, by referring to a map as shown in FIG. 11 from the read engine speed Ne and target fuel injection Qfdrv, volumetric efficiency corresponding basic value Kinb is calculated and by searching a table as shown in FIG. 12 from intake air pressure, intake air pressure correction value Kinh is calculated.

At a step S63, volumetric efficiency corresponding value Kin is calculated by carrying out an intake air pressure correction and EGR correction for volumetric efficiency corresponding value Kinb by means of the following equation.

$Kin=Kinb \times Kinh/(1+Megrd/100)$

At a step S64, control unit 20 calculates response time constant corresponding value Kkin in the intake air system and the present routine is ended. It is noted that volume ratio KVOL is a ratio between the volume of intake air system (collector 5a and intake manifold 5) and cylinder stroke volume (KVOL=Vc/Vm).

$Kkin=Kin \times KVOL$ (volume ratio).

Figure 13:
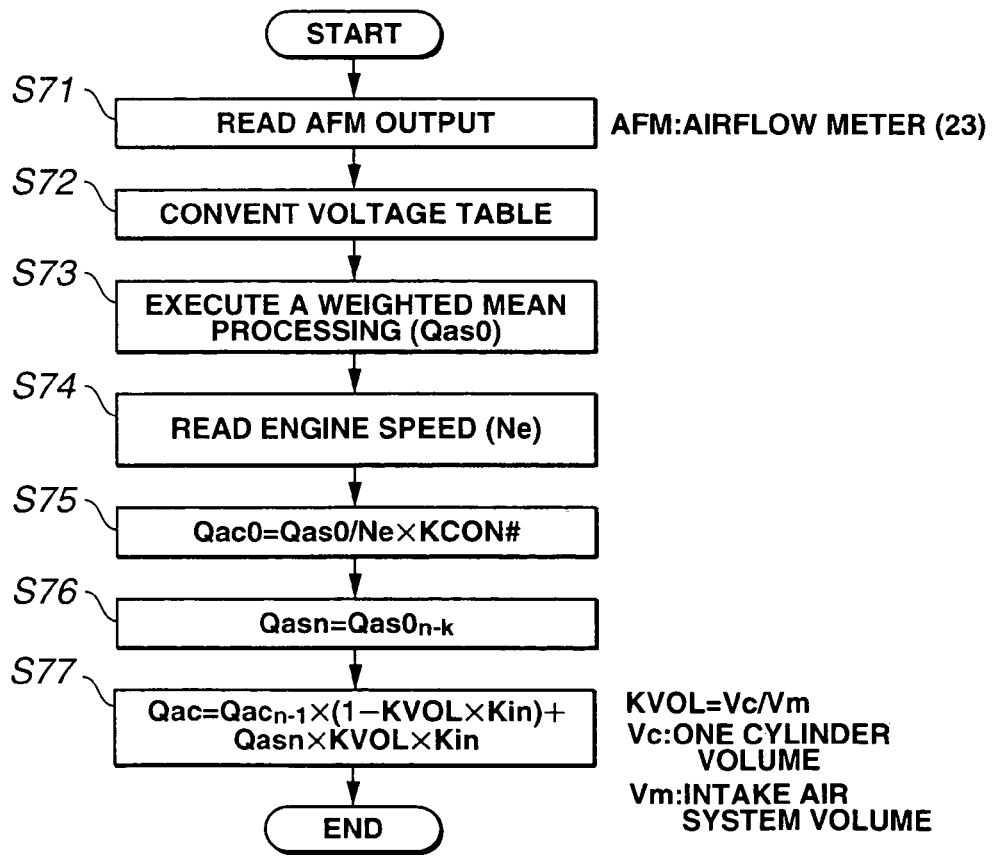
FIG. 13 is an operational flowchart representing a calculation of a cylinder intake fresh air quantity.
Figure 14:
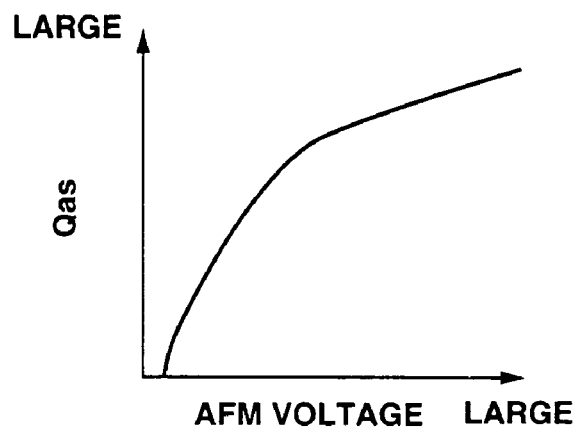
FIG. 14 is an example of a map representing a conversion table from an airflow meter (AFM) output voltage to an intake air flow quantity

FIG. 13 shows an operational flowchart for calculating a cylinder intake air fresh air quantity Qac. In FIG. 13, control unit 20 reads output voltage Us of AFM (airflow meter) 23 at a step S71. At a step S72, control unit 20 converts the read output voltage Us into a corresponding intake air quantity Qas by referring to a table shown in FIG. 14. At a step S73, a weighted mean processing is executed for Qas to derive Qas0. At a step S74, control unit 20 reads engine speed Ne. At a step S75, control unit 20 calculates intake air quantity per cylinder Qac0 according to the following equation using weight mean processed intake air quantity Qas0 derived by the weighted mean processing at step S73. Qac0=Qas0×KCON/Ne, wherein KCON denotes a constant (30 in the case of a four-cylinder engine and 20 in the case of a six-cylinder engine). At a step S76, the delay processing for n number of times calculations of intake air quantity Qas0 is carried out and control unit 20 calculates a collector inlet fresh air quantity Aasn (=Qas0$_{n-k}$). At a step S77, control unit 20 derives cylinder intake air fresh air quantity Qac by carrying out a delay processing (a transport delay from AFM 23 to collector 5a) as described below using volume ratio KVOL and volumetric efficiency corresponding value Kin (or using response time constant corresponding value Kkin in the intake air system) as will be described below. Then, the routine of FIG. 13 is ended.

$Qac=Qac(n-1) \times (1-KVOL \times Kin)+Qasn \times KVOL \times Kin$.

Figure 15:
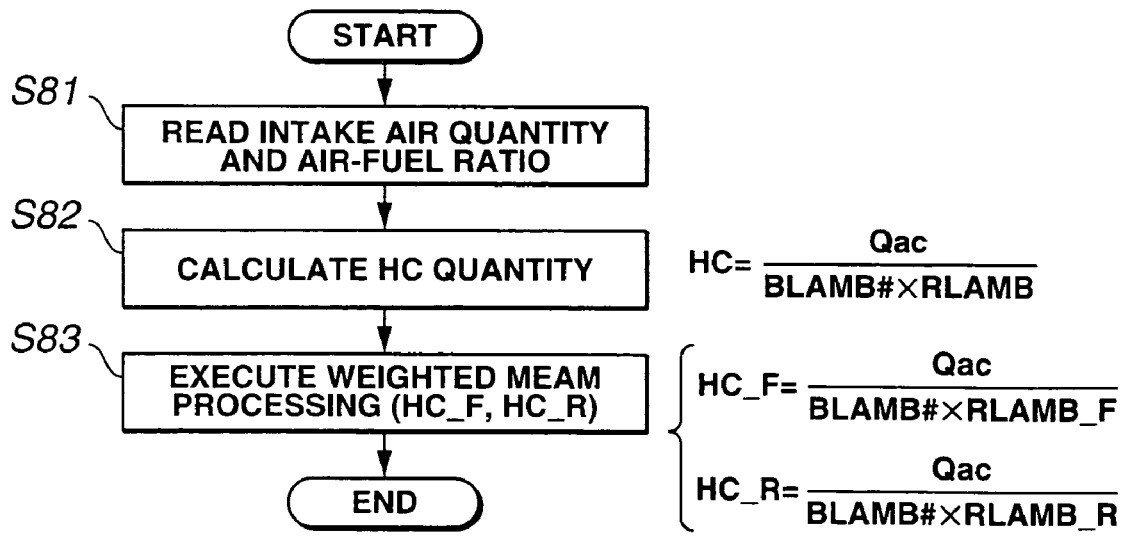
FIG. 15 is an operational flowchart representing a processing routine to calculate an extra reducing agent (extra HC quantity).

FIG. 15 shows an operational flowchart to calculate reducing agent quantity (HC quantity).

In FIG. 15, at a step S81, control unit 20 reads cylinder intake air fresh air quantity Qac, an upstream side excess air ratio RLAMP_F, and downstream side excess air ratio RLAMP_R. At a step S82, control unit 20 calculates HC quantity as follows using a predetermined coefficient BLAMNB#.

$HC$(quantity)$=Qac/(BLAMB\# \times RLAMB)$.

It is noted that RLAMB=RLAMB_F in the case of an upstream side HC quantity and RLAMB=RLAMB_R in the case of a downstream side HC quantity. At a step S83, control unit 20 calculates the weighted mean processing for HC quantity derived at step S82 to derive upstream side HC quantity HC_F and downstream side HC quantity HC_R and the processing is ended.

Figure 16:
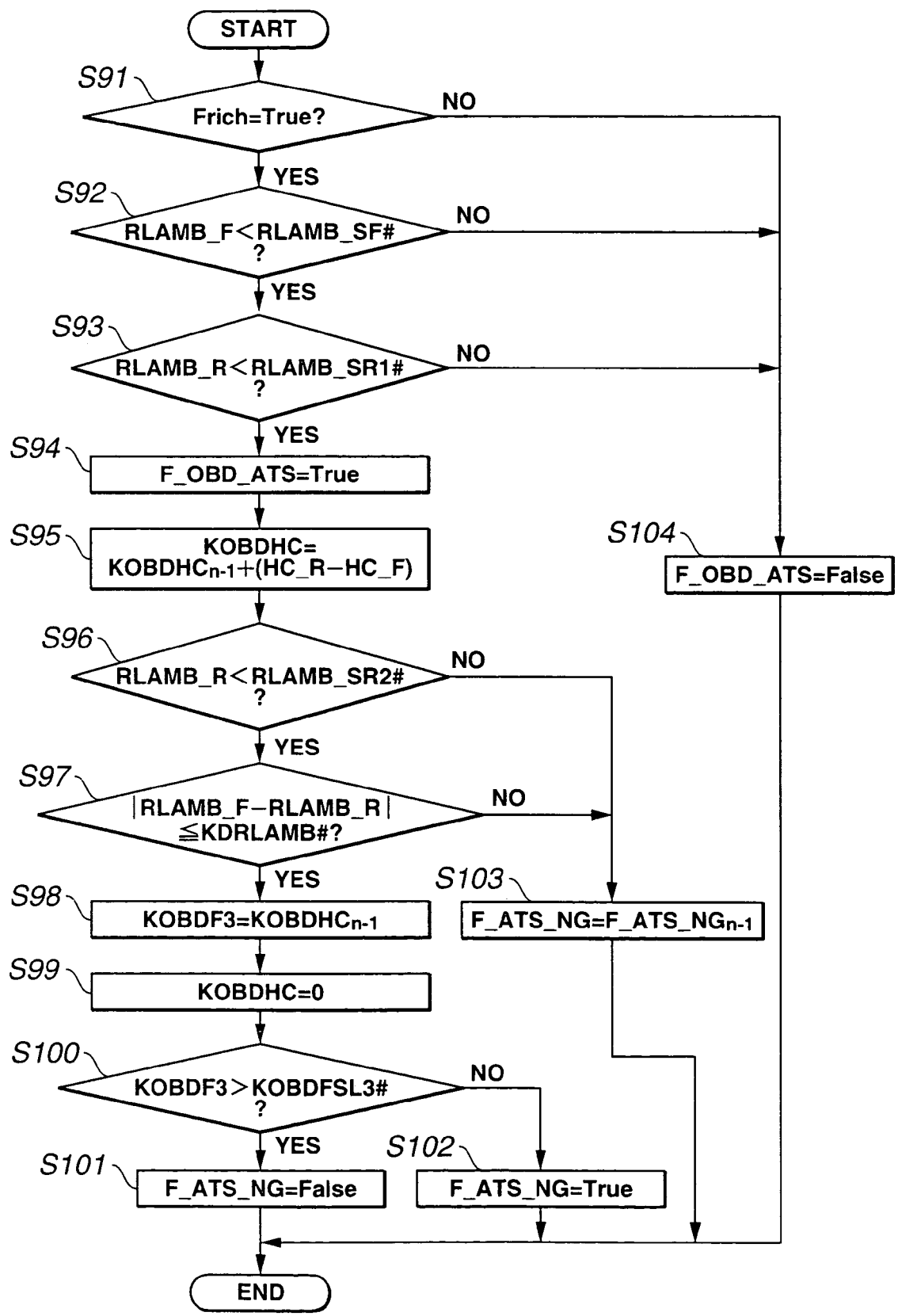
FIG. 16 is an operational flowchart representing the execution of the abnormality determination by the control unit in a case of a third preferred embodiment of the exhaust gas purifying apparatus according to the present invention.

FIG. 16 shows an operational flowchart of the abnormality determination execution for NOx removing (reduction) catalyst 12 in the third embodiment of the exhaust gas purifying apparatus according to the present invention. The contents of steps S91 through S94 are the same as steps S31 through S34. Thus, the detailed description of steps S91 through S94 will herein be omitted. At a step S95, control unit 20 calculates an integration quantity KOBDHC of the difference between downstream side HC quantity HC_R and upstream side HC quantity HC_F according to the following equation.

$$KOBDHC=KOBDHC_{n-1}+(HC\_R-HC\_F),$$

wherein n denotes an arbitrary integer and $KOBDHC_{n-1}$ denotes a previous value of KOBDHC.

At a step S96 and at a step S97, in the same way as steps S36 and S37 described in the second embodiment, control unit 20 determines whether downstream side excess air ratio RLAMB_R is smaller than a predetermined value RLAMB_SR2# (<RLAMB_SF1#) or the difference between upstream side excess air ratio RLAMB_F and downstream side excess air ratio RLAMB_R is within predetermined value of KDRLAMB#. If both of the conditions are satisfied, the routine goes to a step S98. On the other hand, if either one of the two conditions is not satisfied, the routine goes to a step S93. In the same way as each of the first and second embodiments, the processing is ended as treated that the present result is the same as the previous result.

At a step S98, control unit 20 defines calculated integration quantity KOBDHC as a final HC integration value KOBDF3 for the abnormality determination. At a step S99, control unit 20 clears integration quantity KOBDHC. At a step S100, control unit 20 determines whether final HC integration value KOBDF3 is larger than a predetermined catalyst abnormality determination threshold value KOBDFSL3#. If KOBDF3>KOBDFSL3# (yes) at step S100, the routine goes to a step 101. Then, control unit 20 determines that the catalyst is abnormal (deteriorated), flag F_ATS_NG=True, and the present routine is ended.

Figure 17A:
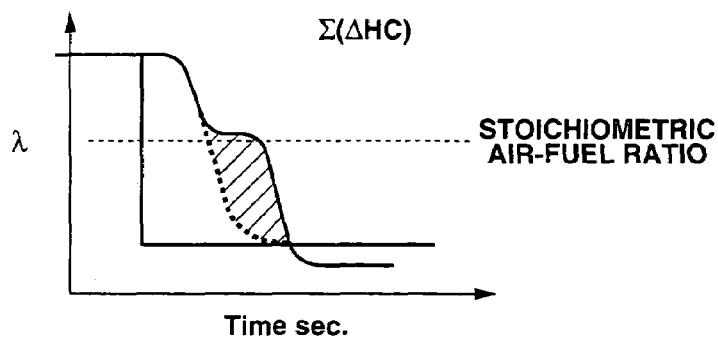
FIGS. 17A, 17B, and 17C are explanatory views for explaining advantages of the exhaust gas purifying apparatus in the case of the third embodiment shown in FIG. 16.
Figure 17B:
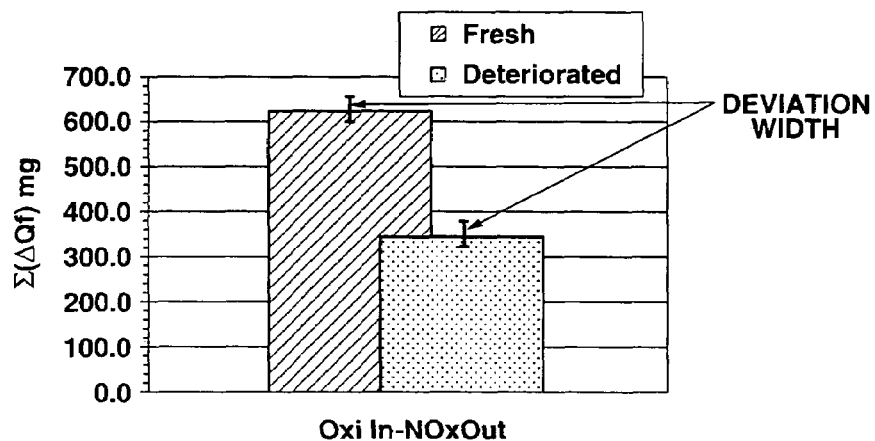
Figure 17C:
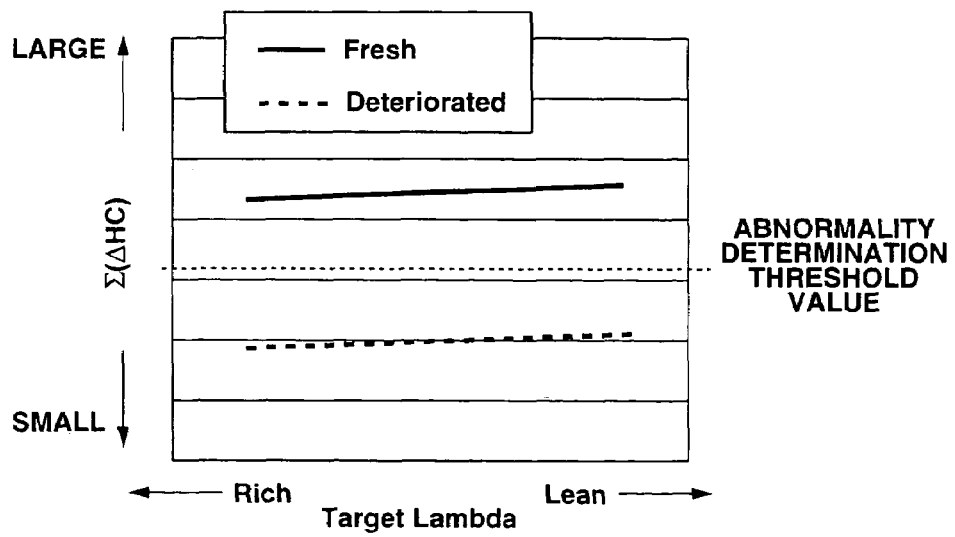

In this embodiment, final HC integration value KOBDF3 (an oblique portion of FIG. 17A) which is the gross reducing agent (HC) quantity reacted with the oxygen during the completion of the release of the absorbed NOx by means of the upstream side reducing agent quantity (HC_F) and the downstream side reducing agent quantity (HC_R) is calculated although, in the second embodiment, the abnormality determination is carried out using final excess air ratio integration value KOBDF2 which is the integration quantity of a percentage of the extra reducing agent in the second embodiment. This final HC integration value KOBDF3 is compared with the catalyst abnormality determination threshold value KOBDFSL3# which is the previously derived by the experiments to carry out the abnormality determination. Hence, as shown in FIGS. 17B and 17C, the influences of the control error and the control deviations given to the air-fuel ratio during the execution of the rich spike control are eliminated and the stable abnormality determination with a high accuracy can be achieved.

Figure 18:
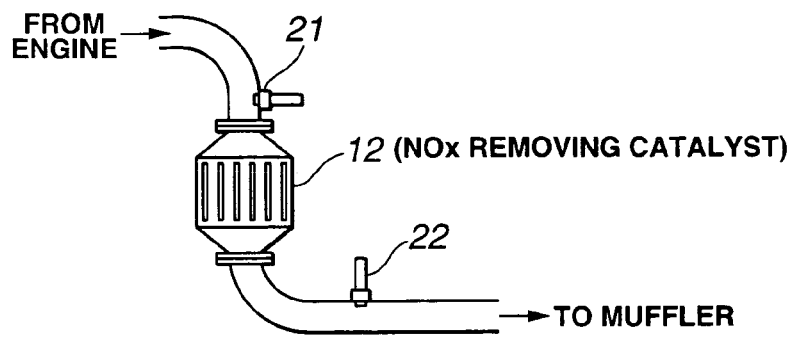
FIG. 18 is a schematic view of an example of a system configuration of an essential part of the exhaust gas purifying apparatus described in each of the first, second, and third embodiments.
Figure 19:
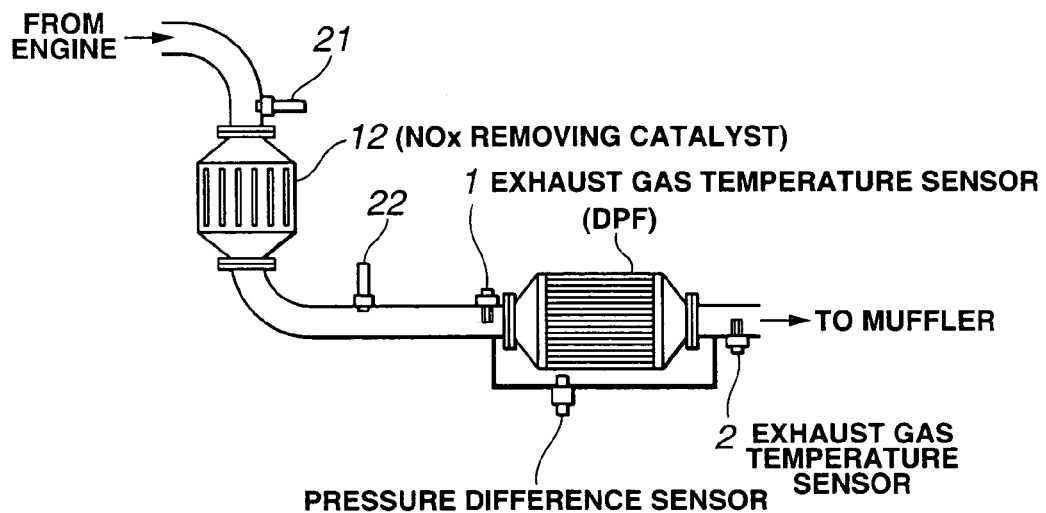
FIG. 19 is a schematic view of an example of another system configuration of the essential part of the exhaust gas purifying apparatus described in each of the first, second, and third embodiments.
Figure 20:
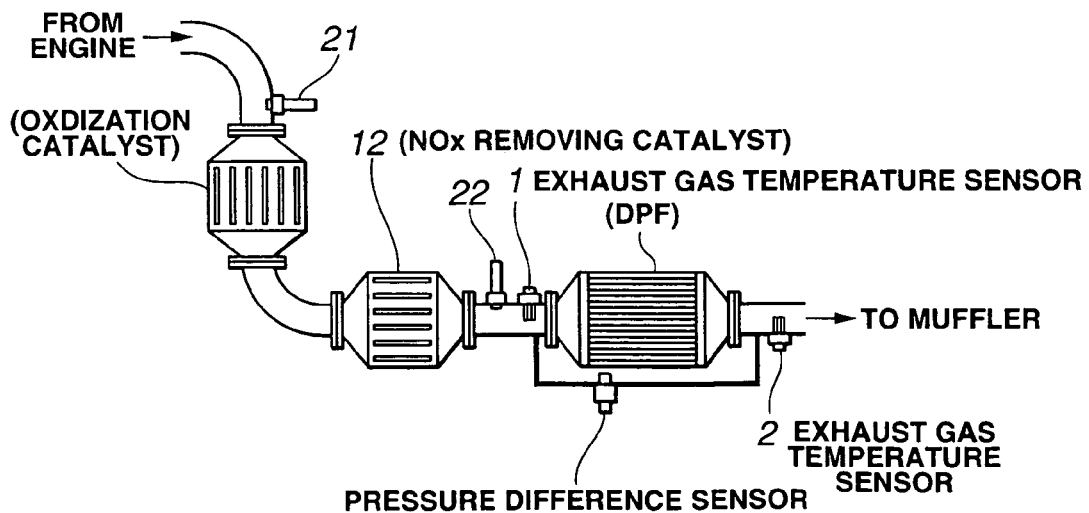
FIG. 20 is a schematic view of an example of a still another system configuration of the essential part of the exhaust gas purifying apparatus described in the first, second, and third embodiments.

In each of the first through third embodiments described above, the exhaust gas purifying apparatus is constituted only by NOx removing (reduction) catalyst 12 as shown in FIG. 18. However, the present invention is not limited to this structure. For example, as shown in FIG. 19, the present invention is applicable to a Diesel engine in which a DPF (Diesel Particulate Filter) to purify particulate matters (abbreviated as PM) in the exhaust gas is mounted at a portion of the exhaust passage, for example, a downstream with respect to NOx removing (reduction) catalyst 12. Furthermore, as shown in FIG. 20, the present invention is applicable to a combination with another oxidization catalyst and the DPF to constitute the exhaust gas purifying apparatus. These alternatives can have the same advantages of each of the above-described first through third embodiments. In addition, if a plurality of the abnormality determination threshold values are provided, a magnitude of the abnormality (a deterioration level) may be determined in addition to the presence or absence of the abnormality of the NOx removing catalyst.

The entire contents of a Japanese Patent Application No. 2003-049569 (filed in Japan on Feb. 26, 2003) are herein incorporated by reference. The scope of the invention is defined with reference to the following claims.

What is claimed is:

1. An exhaust gas purifying method for an internal combustion engine, the internal combustion engine comprising an NOx removing catalyst that absorbs nitrogen oxides in an exhaust gas of the engine when an air-fuel ratio of the exhaust gas streaming thereinto is lean and that releases and reduces the absorbed nitrogen oxides therefrom when the air-fuel ratio of the exhaust gas streaming thereinto is rich, the method comprising:

providing an exhaust gas atmosphere varying section that varies a ratio between an oxidizing agent in the exhaust gas and a reducing agent therein;

providing a first exhaust gas atmosphere detecting section disposed in an upstream side of an exhaust passage with respect to the NOx removing catalyst to detect the ratio between the oxidizing agent in the exhaust gas and the reducing agent therein;

providing a second exhaust gas atmosphere detecting section disposed in a downstream side of the exhaust passage with respect to the NOx removing catalyst to detect the ratio between the oxidizing agent in the exhaust gas and the reducing agent therein; and executing an abnormality determination of the NOx removing catalyst on the basis of output values of both of the first exhaust gas atmosphere detecting section and the second exhaust gas atmosphere detecting section from a time at which the output value of the first exhaust gas atmosphere detecting section is varied to a first predetermined value to a time at which the output value of the second exhaust gas atmosphere detecting section reaches-a second predetermined value when the exhaust gas atmosphere varying section increases the ratio between the reducing agent and the oxidizing agent in the exhaust gas;

calculating an integration quantity with respect to time of a difference between the output values of the first exhaust gas atmosphere detecting means and the second exhaust gas atmosphere detecting means and executing the abnormality determination of the NOx removing catalyst on the basis of the calculated integration quantity of the difference; and suspending the abnormality determination of the NOx removing catalyst when the difference of the output values of the first exhaust atmosphere detecting section and the second exhaust gas atmosphere detecting section is larger than a third predetermined value when the output value of the second exhaust gas atmosphere detecting section reaches the second predetermined value.

2. An exhaust gas purifying apparatus for an internal combustion engine, comprising:

NOx removing catalyst means for absorbing nitrogen oxides in an exhaust gas of the engine when an air-fuel ratio of the exhaust gas streaming thereinto is lean and that releases and reduces the absorbed nitrogen oxides therefrom when the air-fuel ratio of the exhaust gas streaming thereinto is rich;

exhaust gas atmosphere varying means for varying a ratio between an oxidizing agent in the exhaust gas and a reducing agent therein;

first exhaust gas atmosphere detecting means disposed in an upstream side of an exhaust passage with respect to the NOx removing catalyst means for detecting the ratio between the oxidizing agent in the exhaust gas and the reducing agent therein;

second exhaust gas atmosphere detecting means disposed in a downstream side of the exhaust passage with respect to the NOx removing catalyst means for detecting the ratio between the oxidizing agent in the exhaust gas and the reducing agent therein; and abnormality determining means for executing an abnormality determination of the NOx removing catalyst means on the basis of output values of both of the first exhaust gas atmosphere detecting means and the second exhaust gas atmosphere detecting means from a time at which the output value of the first exhaust gas atmosphere detecting means is varied to a first predetermined value to a time at which the output value of the second exhaust gas atmosphere detecting means reaches a second predetermined value when the exhaust gas atmosphere varying means increases the ratio between the reducing agent and the oxidizing agent in the exhaust gas, wherein the abnormality determining means calculates an integration quantity with respect to time of a difference between the output values of the first exhaust gas atmosphere detecting means and the second exhaust gas atmosphere detecting means and executes the abnormality determination of the NOx removing catalyst on the basis of the calculated integration quantity of the difference, and wherein the abnormality determining means suspends the abnormality determination of the NOx removing catalyst means when the difference of the output values of the first exhaust atmosphere detecting means and the second exhaust gas atmosphere detecting means is larger than a third predetermined value when the output value of the second exhaust gas atmosphere detecting means reaches the second predetermined value.

3. An exhaust gas purifying apparatus for an internal combustion engine, comprising:

an NOx removing catalyst that absorbs nitrogen oxides in an exhaust gas of the engine when an air-fuel ratio of the exhaust gas streaming thereinto is lean and that releases and reduces the absorbed nitrogen oxides therefrom when the air-fuel ratio of the exhaust gas streaming thereinto is rich;

an exhaust gas atmosphere varying section that varies a ratio between an oxidizing agent in the exhaust gas and a reducing agent therein;

a first exhaust gas atmosphere detecting section disposed in an upstream side of an exhaust passage with respect to the NOx removing catalyst to detect the ratio between the oxidizing agent in the exhaust gas and the reducing agent therein;

a second exhaust gas atmosphere detecting section disposed in a downstream side of the exhaust passage with respect to the NOx removing catalyst to detect the ratio between the oxidizing agent in the exhaust gas and the reducing agent therein; and an abnormality determining section that executes an abnormality determination of the NOx removing catalyst on the basis of output values of both of the first exhaust gas atmosphere detecting section and the second exhaust gas atmosphere detecting section from a time at which the output value of the first exhaust gas atmosphere detecting section is varied to a first predetermined value to a time at which the output value of the second exhaust gas atmosphere detecting section is reached to a second predetermined value when the exhaust gas atmosphere varying section increases the ratio of the reducing agent in the exhaust gas, wherein the abnormality determining section calculates an integration quantity of a difference between the output values of the first and second exhaust gas atmosphere detecting sections and executes the abnormality determination of the NOx removing catalyst on the basis of the calculated integration quantity of the difference, and wherein the abnormality determining section suspends the abnormality determination of the NOx removing catalyst when the difference of the output values of the first exhaust atmosphere detecting section and the second exhaust gas atmosphere detecting section is larger than a third predetermined value when the output value of the second exhaust gas atmosphere detecting section reaches the second predetermined value.

4. An exhaust gas purifying apparatus for an internal combustion engine, comprising:

an NOx removing catalyst that absorbs nitrogen oxides in an exhaust gas of the engine when an air-fuel ratio of the exhaust gas streaming thereinto is lean and that releases and reduces the absorbed nitrogen oxides therefrom when the air-fuel ratio of the exhaust gas streaming thereinto is rich;

an exhaust gas atmosphere varying section that varies a ratio between an oxidizing agent in the exhaust gas and a reducing agent therein;

a first exhaust gas atmosphere detecting section disposed in an upstream side of an exhaust passage with respect to the NOx removing catalyst to detect the ratio between the oxidizing agent in the exhaust gas and the reducing agent therein;

a second exhaust gas atmosphere detecting section disposed in a downstream side of the exhaust passage with respect to the NOx removing catalyst to detect the ratio between the oxidizing agent in the exhaust gas and the reducing agent therein; and an abnormality determining section that executes an abnormality determination of the NOx removing catalyst on the basis of output values of both of the first exhaust gas atmosphere detecting section and the second exhaust gas atmosphere detecting section from a time at which the output value of the first exhaust gas atmosphere detecting section is varied to a first predetermined value to a time at which the output value of the second exhaust gas atmosphere detecting section is reached to a second predetermined value when the exhaust gas atmosphere varying section increases the ratio of the reducing agent in the exhaust gas, wherein the abnormality determining section calculates an integration quantity with respect to time on the basis of a previous integration quantity with respect to time thereof and a difference between the output values of the first and second exhaust gas atmosphere detecting sections and executes the abnormality determination of the NOx removing catalyst on the basis of the calculated integration quantity of the difference, and wherein the abnormality determining section suspends the abnormality determination of the NOx removing catalyst when the difference of the output values of the first exhaust atmosphere detecting section and the second exhaust gas atmosphere detecting section is larger than a third predetermined value when the output value of the second exhaust gas atmosphere detecting section reaches the second predetermined value.

5. An exhaust gas purifying apparatus for an internal combustion engine, comprising:

an NOx removing catalyst that absorbs nitrogen oxides in an exhaust gas of the engine when an air-fuel ratio of the exhaust gas streaming thereinto is lean and that releases and reduces the absorbed nitrogen oxides therefrom when the air-fuel ratio of the exhaust gas streaming thereinto is rich;

an exhaust gas atmosphere varying section that varies a ratio between an oxidizing agent in the exhaust gas and a reducing agent therein;

a first exhaust gas atmosphere detecting section disposed in an upstream side of an exhaust passage with respect to the NOx removing catalyst to detect the ratio between the oxidizing agent in the exhaust gas and the reducing agent therein;

a second exhaust gas atmosphere detecting section disposed in a downstream side of the exhaust passage with respect to the NOx removing catalyst to detect the ratio between the oxidizing agent in the exhaust gas and the reducing agent therein; and an abnormality determining section that executes an abnormality determination of the NOx removing catalyst on the basis of output values of both of the first exhaust gas atmosphere detecting section and the second exhaust gas atmosphere detecting section from a time at which the output value of the first exhaust gas atmosphere detecting section is varied to a first predetermined value to a time at which the output value of the second exhaust gas atmosphere detecting section is reaches a second predetermined value when the exhaust gas atmosphere varying section increases the ratio between the reducing agent and the oxidizing agent in the exhaust gas, wherein the abnormality determining section calculates an integration quantity with respect to time of a difference between the output values of the first exhaust gas atmosphere detecting section and the second exhaust gas atmosphere detecting section and executes the abnormality determination of the NOx removing catalyst on the basis of the calculated integration quantity of the difference, and wherein the abnormality determining section suspends the abnormality determination of the NOx removing catalyst when the difference of the output values of the first exhaust atmosphere detecting section and the second exhaust gas atmosphere detecting section is larger than a third predetermined value when the output value of the second exhaust gas atmosphere detecting section reaches the second predetermined value.

6. An exhaust gas purifying apparatus for an internal combustion engine as claimed in claim 5, wherein each of the first exhaust gas atmosphere detecting section and the second exhaust gas atmosphere detecting section detects an oxygen concentration in the exhaust gas.

7. An exhaust gas purifying apparatus for an internal combustion engine as claimed in claim 6, wherein the first exhaust gas atmosphere detecting section comprises an upstream side oxygen concentration sensor disposed at the upstream side of the exhaust passage with respect to the NOx removing catalyst and the second exhaust gas atmosphere detecting section comprises a downstream side oxygen concentration sensor disposed at the downstream side of the exhaust passage with respect thereto and wherein the abnormality determining section executes the abnormality determination of the NOx removing catalyst for an interval of time at which the output value of the downstream side oxygen concentration sensor is maintained within a predetermined range in the vicinity to a stoichiometric air-fuel ratio when the exhaust gas atmosphere varying section increases the ratio of the reducing agent in the exhaust gas.

8. An exhaust gas purifying apparatus for an internal combustion engine as claimed in claim 7, wherein the abnormality determining section comprises: an integration quantity calculating section that calculates an integration quantity (KOBDO2) with respect to time of a difference between output voltages of the downstream side oxygen concentration sensor and the upstream side oxygen concentration sensor (VO2_R−VO2_F) as follows: $KOBDO2 = KOBDO2_{n-1} + (VO2\_R - VO2\_F)$, wherein n denotes an arbitrary integer and $KOBDO2_{n-1}$ is a previous value of KOBDO2.

9. An exhaust gas purifying apparatus for an internal combustion engine as claimed in claim 8, wherein the abnormality determining section comprises:

an NOx release end determining section that determines whether an interval of time during which the downstream side exhaust gas air-fuel ratio is maintained in the vicinity to the stoichiometric air-fuel ratio is ended; and an absolute value of difference calculating section that determines whether an absolute value of the difference between the output voltages of the upstream side oxygen concentration sensor and of the downstream side oxygen concentration sensor is equal to or lower than a third predetermined value (KDVO2#) when the NOx release end determining section determines that the interval of time is ended.

10. An exhaust gas purifying apparatus for an internal combustion engine as claimed in claim 9, wherein the abnormality determining section defines the calculated integration quantity (KOBDO2) as a final oxygen concentration sensor output voltage value (KOBDF1) for the abnormality determination and clears the calculated integration quantity when the absolute value of difference calculating section determines that the absolute value of the difference between the output voltages of the upstream side oxygen concentration sensor and of the downstream side oxygen concentration sensor (|VO2_F−VO2_R) is equal to or lower than the third predetermined value (KDVO2#) and determines whether the final oxygen concentration sensor output voltage value (KOBDF1) is larger than at least one predetermined abnormality determined threshold value (KOBDFSL1#1) to determine whether the abnormality of the NOx removing catalyst is present.

11. An exhaust gas purifying apparatus for an internal combustion engine as claimed in claim 9, wherein, when the absolute value of difference calculating section determines that the absolute value of the difference between the output voltages of the upstream side and downstream side oxygen concentration sensors (|VO2_F−VO2_R|) is larger than the third predetermined value (KDVO2#), the abnormality determination by the abnormality determining section is suspended.

12. An exhaust gas purifying apparatus for an internal combustion engine as claimed in claim 5, wherein each of the first exhaust gas atmosphere detecting section and the second exhaust gas atmosphere detecting section detects an air-fuel ratio of the exhaust gas.

13. An exhaust gas purifying apparatus for an internal combustion engine as claimed in claim 12, wherein the abnormality determining section calculates an extra HC quantity in the exhaust gas on the basis of the detected exhaust gas air-fuel ratio and an intake fresh air quantity and wherein the abnormality determining section executes the abnormality determination of the NOx removing catalyst on the basis of an integration quantity with respect to time of a difference between the extra HC quantity in the exhaust gas at the upstream side of the exhaust passage with respect to the NOx removing catalyst and the extra HC quantity in the exhaust gas at the downstream side of the exhaust passage with respect to the NOx removing catalyst.

14. An exhaust gas purifying apparatus for an internal combustion engine as claimed in claim 13, wherein the cylinder intake fresh air quantity (Qac) is determined as follows:

Qac=Qac(n−1)×(1−KVOL×Kin)+Qasn×KVOL×Kin, wherein KVOL denotes a cylinder volume ratio, Kin denotes a volumetric efficiency corresponding value, and Qasn denotes an engine collector inlet fresh air rate and the first exhaust gas atmosphere detecting section comprises an upstream side λ sensor and the second exhaust gas atmosphere detecting section comprises a downstream side λ sensor and an extra reducing agent quantity (HC quantity) is determined on the basis of an excess air ratio of the upstream side λ sensor (RLAMB_F), the excess air ratio of the downstream side λ sensor (RLAMB_R), and the cylinder intake air fresh air rate (Qac) as follows: HC (quantity)=Qac/(BLAMB#×RLAMB), wherein BLAMB# denotes a predetermined coefficient, RLAMB=RLAMB_F in a case of the upstream side λ sensor and RLAMB=RLAMB_R in the case of the downstream side λ sensor and an upstream side HC quantity HC_F and a downstream side HC quantity HC_F are calculated from a weighted mean processed calculated upstream side HC (quantity) and from a weight mean processed calculated downstream side HC (quantity), respectively.

15. An exhaust gas purifying apparatus for an internal combustion engine as claimed in claim 14, wherein the abnormality determining section comprises an integration quantity calculating section that calculates an integration quantity with respect to time (KOBDHC) of a difference between the downstream side HC quantity (HC_R) and the upstream side HC quantity (HC_F) as follows: KOBDHC=KOBDHC$_{n-1}$+(HC_R−HC_F), wherein n denotes an arbitrary integer and KOBDHC$_{n-1}$ denotes a previous value of KOBDHC.

16. An exhaust gas purifying apparatus for an internal combustion engine as claimed in claim 15, wherein the abnormality determining section comprises:

an NOx release end determining section that determines whether an interval of time during which the downstream side excess air ratio is maintained in the vicinity to the stoichiometric air-fuel ratio is ended; and an absolute value of difference calculating section that calculates an absolute value of a difference between the HC quantity at the upstream side λ sensor and the HC quantity at the downstream side λ sensor falls within the second predetermined value (KDRLAMB#) when the NOx release end determining section determines that the interval of time is ended.

17. An exhaust gas purifying apparatus for an internal combustion engine as claimed in claim 12, wherein the first and second exhaust gas atmosphere detecting sections comprise an upstream side λ sensor and a downstream side λ sensor, respectively, and wherein the exhaust gas purifying apparatus further comprises an excess air ratio calculating section that calculates an upstream side excess air ratio (RLAMB_F) at the upstream side of the exhaust passage with respect to the NOx removing catalyst on the basis of a pump current value of the upstream side λ sensor disposed at the upstream side of the exhaust passage with respect to the NOx removing catalyst and calculates a downstream side excess air ratio (RLAMB_R) at the downstream side of the exhaust passage with respect to the NOx removing catalyst on the basis of the pump current value of the downstream side λ sensor disposed at the downstream side of the exhaust passage with respect to the NOx removing catalyst.

18. An exhaust gas purifying apparatus for an internal combustion engine as claimed in claim 17, wherein the abnormality determining section comprises an integration quantity calculating section that calculates an integration quantity (KOBDRLAMB) with respect to time of a difference between the downstream side excess air ratio (RLAMB_R) and the upstream side excess air ratio (RLAMB_F) as follows: KOBDRLAMB=KOBDRLAMB$_{n-1}$+(RLAMB_R−RLAMB_F), wherein n denoted an arbitrary integer and KOBDRLAMB$_{n-1}$ denotes a previous value of KOBDRLAMB.

19. An exhaust gas purifying apparatus for an internal combustion engine as claimed in claim 18, wherein the abnormality determining section comprises: an NOx release end determining section that determines whether an interval of time during which the downstream side excess air ratio is maintained in the vicinity to the stoichiometric air-fuel ratio is ended; and an absolute value of difference calculating section that calculates an absolute value of a difference between the excess air ratio of the upstream side λ sensor and the excess air ratio of the downstream side λ sensor falls within the second predetermined value (KDRLAMB#) when the NOx release end determining section determines that the interval of time is ended.

20. An exhaust gas purifying apparatus for an internal combustion engine as claimed in claim 19, wherein the abnormality determining section defines the calculated integration quantity (KOBDRLAMB) as a final excess air ratio integration value (KOBDF2) for the abnormality determination of the NOx removing catalyst and clears the calculated integration quantity and determines whether the final excess air ratio integration value (KOBDF2) is larger than at least one predetermined abnormality determination threshold value (KOBDFSL2#) to determine whether the abnormality of the NOx removing catalyst is present.

* * * * *